United States Patent
Nakajima et al.

[11] Patent Number: 5,936,519
[45] Date of Patent: Aug. 10, 1999

[54] METHOD OF AND DEVICE FOR DETECTING TIRE PRESSURE DROP

[75] Inventors: Mikao Nakajima; Toshihiro Toda, both of Osaka, Japan

[73] Assignees: Sumitomo Electric Industries, Ltd.; Sumitomo Rubber Industries, Ltd., both of Osaka, Japan

[21] Appl. No.: 08/785,742

[22] Filed: Jan. 17, 1997

[30] Foreign Application Priority Data

Jan. 26, 1996 [JP] Japan .................................. 8-012122

[51] Int. Cl.⁶ .................................................. B60C 23/00
[52] U.S. Cl. ........................ 340/444; 340/442; 73/146.5; 116/34 R
[58] Field of Search .................................. 340/444, 442; 73/146.5, 146.4, 146; 200/61.22; 116/34 R

[56] References Cited

U.S. PATENT DOCUMENTS

| | | | |
|---|---|---|---|
| 4,876,528 | 10/1989 | Walker et al. | 340/442 |
| 5,192,929 | 3/1993 | Walker et al. | 340/444 |
| 5,442,331 | 8/1995 | Kishimoto et al. | 340/444 |
| 5,483,220 | 1/1996 | Kushimoto et al. | 340/444 |
| 5,524,482 | 6/1996 | Kushimoto et al. | 73/146.3 |
| 5,591,906 | 1/1997 | Okawa et al. | 73/146.5 |
| 5,604,307 | 2/1997 | Iida et al. | 73/146.2 |
| 5,629,478 | 5/1997 | Nakajima et al. | 340/444 |
| 5,721,528 | 2/1998 | Boesch et al. | 340/442 |

FOREIGN PATENT DOCUMENTS

| | | |
|---|---|---|
| 0 601 557 A1 | 12/1993 | European Pat. Off. . |
| 0 662 121 A1 | 5/1995 | European Pat. Off. . |
| 63-305011 | 12/1988 | Japan . |
| 4-212609 | 8/1992 | Japan . |
| 7-125512 | 5/1995 | Japan . |

*Primary Examiner*—Jeff Hofsass
*Assistant Examiner*—Sihong Huang
*Attorney, Agent, or Firm*—Rabin & Champagne, P.C.

[57] ABSTRACT

A tire pressure drop detecting method, capable of accurately detecting whether the pneumatic pressure of a tire has dropped even if a large driving torque is exerted on the tires. The rotational angular velocities of tires provided for a vehicle are detected and a front/rear acceleration of the vehicle is detected, and then it is discriminated whether the vehicle is in a predetermined decelerated state or not, based on the detected front/rear acceleration of the vehicle. If the vehicle is in the predetermined decelerated state, it is judged whether the pneumatic pressure of the tires has dropped, based on the detected rotational angular velocities. The pneumatic pressure drop of the tire is judged only when the vehicle is in the decelerated state where a difference between the rotational angular velocity of the tire at the time of pneumatic pressure drop and that at the time of a normal inner pressure is relatively large.

30 Claims, 12 Drawing Sheets

METHOD OF AND DEVICE FOR DETECTING TIRE PRESSURE DROP

BACKGROUND OF THE INVENTION

1. Field of the Invention

The present invention relates to a method of detecting a pneumatic pressure drop of a tire provided for a four-wheel vehicle, and a tire pressure drop detecting device for carrying out this method.

2. Description of the Related Art

As one of safety devices for a four-wheel vehicle such as an automobile, truck, etc., tire pressure drop detecting devices have recently been proposed, and some of them have been put to practical use.

A tire pressure drop detecting device has been developed because its importance is recognized due to the reason shown below. That is, when the pneumatic pressure drops, the temperature of the tire increases due to deflation. When the temperature becomes high, the strength of a polymer material used for the tire is lowered and the tire is likely to burst.

Normally, even if the tire is deflated by a pressure of approximately 0.5 atm, a driver is often unaware of the deflation, so that a device capable of detecting the deflation has been desired.

One method of detecting a tire pressure drop, for example, is a method of utilizing a difference in the respective rotational angular velocities $F_1$, $F_2$, $F_3$ and $F_4$ (referred to as a "rotational angular velocity $F_i$" hereinafter) of four tires $W_1$, $W_2$, $W_3$ and $W_4$ provided for the vehicle. The tires $W_1$ and $W_2$ correspond to right front and left front tires, and the tires $W_3$ and $W_4$ correspond to right rear and left rear tires, respectively. The tires $W_1$, $W_2$, $W_3$ and $W_4$ are referred to as a "tire $W_i$" hereinafter.

When the detected rotational angular velocities $F_i$ are the same, then dynamic loading radiuses (value obtained when a travel distance of the vehicle per unit time is divided by the product of the number of revolutions of the tires and $2\pi$) are the same.

On the other hand, the dynamic loading radius of the tire $W_i$ varies depending on the change in pneumatic pressure of the tire $W_i$. That is, when the pneumatic pressure of the tire $W_i$ drops, the tire $W_i$ contracts. As a result, the dynamic loading radius becomes smaller than that in case of a normal inner pressure. Accordingly, the rotational angular velocity $F_i$ of the tire $W_i$ whose pneumatic pressure drops becomes larger than that at a normal internal pressure. Therefore, the pressure drop of the tire $W_i$ can be detected based on the difference in rotational angular velocities $F_i$ of the tires.

One embodiment of a method of determining the pressure drop of the tire $W_i$ based on the difference in rotational angular velocity $F_i$ is as shown in the following equation (1) (e.g. see Japanese Laid-Open Patent Publication Nos. 63-305011 and 4-212609).

$$D = \frac{\frac{F_1 + F_4}{2} - \frac{F_2 + F_3}{2}}{\frac{F_1 + F_2 + F_3 + F_4}{4}} \times 100 \qquad (1)$$

For example, when it is assumed that the dynamic loading rolling radiuses of the tires $W_i$ are the same, the rotational angular velocities $F_1$ are the same ($F_1=F_2=F_3=F_4$). Accordingly, the judged value D becomes 0. Then, threshold values $D_{TH1}$ and $D_{TH2}$ are set (provided $D_{TH1}$, $D_{TH2}>0$). When the condition shown in the following expression (2) is satisfied, it is judged that a tire $W_i$ whose pneumatic pressure drops is present. When this condition is not satisfied, it is judged that a tire $W_i$ whose pneumatic pressure drops is not present.

$$D<-D_{TH1} \text{ or } D>D_{TH2} \qquad (2)$$

However, when the vehicle is traveling at high speed, the judged value D is sometimes lowered in spite of the existence of a tire whose pneumatic pressure has dropped. In this case, the judged value D does not satisfy the expression (2) and it is likely to be erroneously judged that all tires $W_i$ have a normal inner pressure.

FIG. 12 is a graph showing a change of the judged value D, which is calculated when the pneumatic pressure of any one of four tires $W_1$, $W_2$, $W_3$ and $W_4$ drops when the vehicle is traveling on a flat road, with the velocity of the vehicle. As is apparent from FIG. 12, the judged value D decreases as the velocity of the vehicle increases and becomes generally 0 (zero) when the velocity of the vehicle is about 200 km/hour.

The cause of the decrease in judged value D is as follows. That is, it is known that a grip rate of the tire $W_i$ whose pneumatic pressure drops is larger than that of the tire $W_i$ whose pneumatic pressure is a normal inner pressure. The tire $W_i$ normally rotates with a slight slip. Regarding the tire $W_i$ whose pneumatic pressure drops, however, the slip amount decreases in an amount corresponding to the increase in grip rate. The decrease in slip amount becomes severe as the velocity of the vehicle increases, to cancel the decrease in the number of revolutions due to contraction of the tire $W_i$. As a result, the phenomenon as shown in FIG. 12 arises.

It is considered to apply the technique disclosed in Japanese Laid-Open Patent Publication No. 7-125512 as the technique to cope with the above phenomenon. In the technique disclosed in this gazette, the judged value D is calculated, and then the calculated judged value D is subjected to a velocity correction.

More specifically, in the technique disclosed in the above gazette, a correction factor corresponding to the velocity of the vehicle is previously determined. Specifically, the judged value D must be drastically increased as the velocity of the vehicle becomes higher. Therefore, there is required a correction factor wherein an increase rate becomes higher as the velocity of the vehicle becomes higher. The judged value D is corrected so that the judged value D is multiplied by the reciprocal of the correction factor. As a result, the judged value D is increased to a value large enough to represent the fact that the pneumatic pressure drops. Accordingly, the judged value D in a case that the tire pressure drops satisfies the above expression (2). Therefore, an erroneous detection caused by the decrease in judged value D can be prevented.

By the way, the above velocity correction is conducted not only when the pneumatic pressure of the tire $W_i$ drops but also when all tires $W_i$ have a normal inner pressure. In this case, no problem arises if the judged value is always 0 (zero). Because, even if 0 is multiplied by any numeric value, the resultant is always 0.

However, actually, the judged value D does not necessarily become 0, even if all tires $W_i$ have a normal inner pressure. Because, the rotational angular velocity $F_i$ of each tire Wi varies depending on the traveling state of the vehicle and state of the road surface. In this case, the variation of the rotational angular velocity $W_i$ is promoted when the judged value D is subjected to the velocity correction by which the judged value D is increased. As a result, it is likely to be erroneously detected that there is a tire $W_i$ whose pneumatic pressure drops.

On the other hand, the increase in velocity of the vehicle means an increase in driving torque exerted on the tire $W_i$. That is, the decrease in judged value D in spite of the existence of the tire $W_i$ whose pneumatic pressure drops is caused by the fact that a large driving torque is actually exerted on the tire $W_i$.

Examples of traveling under the condition that a large driving torque is exerted on the tire $W_i$ include traveling on an upward slope, in addition to the traveling at high speed. Accordingly, the decrease in judged value D is observed due to the same reason as that described above when the vehicle is traveling on the upward slope, even when the vehicle is traveling at low speed.

It is considered to subject the judged value D to the above-described velocity correction so as to cope with the above problem. However, the correction factor in the above velocity correction is required so as to increase the increase rate as the velocity of the vehicle becomes higher and, therefore, the judged value D hardly increases when the vehicle is traveling at low speed. Accordingly, it is likely to be erroneously detected that all tires $W_i$ have a normal inner pressure in spite of the existence of a tire $W_i$ whose pneumatic pressure drops.

In such way, when the vehicle is traveling under the condition that a large driving torque is exerted on the tire $W_i$, erroneous detection is sometimes conducted because the velocity correction is made, and the velocity correction is sometimes meaningless for avoiding an erroneous detection.

SUMMARY OF THE INVENTION

An object of the present invention is to provide a tire pressure drop detecting method, capable of accurately detecting whether the pneumatic pressure of a tire drops or not even if the vehicle is traveling under the condition that a large driving torque is exerted on the tire.

Another object of the present invention is to provide a tire pressure drop detecting device, capable of detecting whether the pneumatic pressure of a tire drops or not even if the vehicle is traveling under the condition that a large driving torque is exerted on the tire.

Erroneous detection in case where a large driving torque is exerted on the tire is caused by the fact that the rotational angular velocity of the tire whose pneumatic pressure drops and that of the tire having a normal inner pressure are almost the same. Paradoxically speaking, erroneous detection can be avoided without subjecting to the velocity correction, if the difference in rotational angular velocity at the time of pneumatic pressure drop and that at the time of normal inner pressure is relatively large.

On the other hand, when a breaking torque is exerted on the tires, the grip rate of the tire whose pneumatic pressure drops is large. Therefore, the number of revolutions is further increased in addition to the increase in the number of revolutions due to contraction.

In the tire pressure drop detecting method of the present invention, rotational angular velocities of tires provided for a vehicle are detected and a front/rear acceleration of the vehicle is detected, and then it is discriminated whether the vehicle is in a predetermined decelerated state or not, based on the detected front/rear acceleration of the vehicle. If the vehicle is in the predetermined decelerated state, it is judged whether the pneumatic pressure of the tires drops or not, based on the detected rotational angular velocities.

According to this method, the judgment of the pneumatic pressure drop of the tire is performed only when the vehicle is in the decelerated state where a difference between the rotational angular velocity of the tire at the time of a pneumatic pressure drop and that at the time of a normal inner pressure is relatively large. Accordingly, it is possible to accurately detect whether the pneumatic pressure of a tire drops, or even if the vehicle is not traveling at high speed or traveling on an upward slope.

It is preferred that the condition for discriminating that the vehicle is in the predetermined decelerated state is the fact that the detected front/rear acceleration of the vehicle is within the negative predetermined range.

It is preferred that the condition for discriminating that the vehicle is in the predetermined decelerated state also includes the fact that the foot brake pedal provided for the vehicle is not operated. When braking is caused by depression of the foot brake pedal, the rotational angular velocities of the tires vary according to the wear state of the brake pads. Accordingly, when the pneumatic pressure drop is detected in this case, an erroneous detection is likely to be conducted. Therefore, the pneumatic pressure can be accurately detected by inhibiting tire pressure drop detection at times when the foot brake pedal is operated.

It is preferred that the front/rear acceleration of the vehicle is determined by determining the front/rear accelerations of the tires, based on the rotational angular velocities detected with respect to a plurality of tires, and averaging the resulting front/rear accelerations of a plurality of tires.

In such way, the front/rear acceleration of the vehicle can be detected, based on the rotational angular velocities of the tires as fundamental information, so that a special construction for detecting the front/rear acceleration is not necessary.

In this case, it is preferred that the front/rear acceleration of the vehicle is determined by averaging the front/rear accelerations of a plurality of following tires to which no driving force is transmitted. Noise is liable to be included in the rotational angular velocity of the driving tire, to which a driving force is transmitted due to spin, while the rotational angular velocity of the following tires, to which no driving force is transmitted, does not cause such a problem. Accordingly, the front/rear acceleration of the vehicle can be detected more accurately by using only the rotational angular velocities of the following tires.

The judgment of the pneumatic pressure drop is preferably conducted as follows. That is, when the judged value is determined by substituting the detected rotational angular velocity into the predetermined judging equation, and then it is judged that the vehicle is in the decelerated state, the determined judged value is held and it is judged whether a predetermined number of the judged values are held or not. If the predetermined number of the judged values are held, it is judged whether the tire pressure drops or not, based on a plurality of the judged values held. In that case, it is more preferred that an average value of a plurality of the judged values held is determined, and then it is judged whether tire pressure drops or not, based on the determined average value.

Unexpected noise is likely to be included in the detected rotational angular velocity, depending on the traveling state of the vehicle or road surface state. In this case, the judged value does not accurately represent the state of the tire pressure. Therefore, only one pneumatic pressure drop is likely to cause erroneous detection. Thus, a noise influence can be excluded by using the average value of a plurality of the judged values. Therefore, it is possible to accurately detect whether the tire pressure drops or not.

The judgment of the pneumatic pressure can also be conducted as follows. That is, when the judged value is determined by substituting the detected rotational angular velocity into the predetermined judging equation to detect the velocity of the vehicle, and then it is discriminated that the vehicle is in the decelerated state, the determined judged value is weighted using a weight according to the detected velocity of the vehicle to accumulate the judged value weighted and the weight, and then it is discriminated whether this accumulated weight is not less than a threshold value. When it is discriminated that the accumulated weight is not less than the threshold value, it is detected whether the tire pressure has dropped or not, based on a ratio of the accumulated judged value and the accumulated value.

When the vehicle is traveling at high speed, the traveling state of the vehicle and the road surface state are comparatively stable. Accordingly, unexpected noise is hardly included in the rotational angular velocity. On the other hand, when the tire is punctured, a possibility of bursting increases as the velocity of the vehicle becomes higher. Accordingly, when the vehicle is traveling at high speed, it is preferred to execute the detection of whether the tire pressure has dropped or not, as soon as possible.

Accordingly, if the weight is increased as the velocity of the vehicle becomes higher, the accumulated weight reaches the threshold value more rapidly as the velocity of the vehicle becomes higher. As a result, the detection of whether the tire pressure drops or not can be executed more rapidly as the velocity of the vehicle becomes higher.

The above objects as well as other objects, features and advantages of the present invention will become more apparent to those skilled in the art from the following description with reference to the accompanying drawings.

DESCRIPTION OF THE PREFERRED EMBODIMENTS

Figure 1:
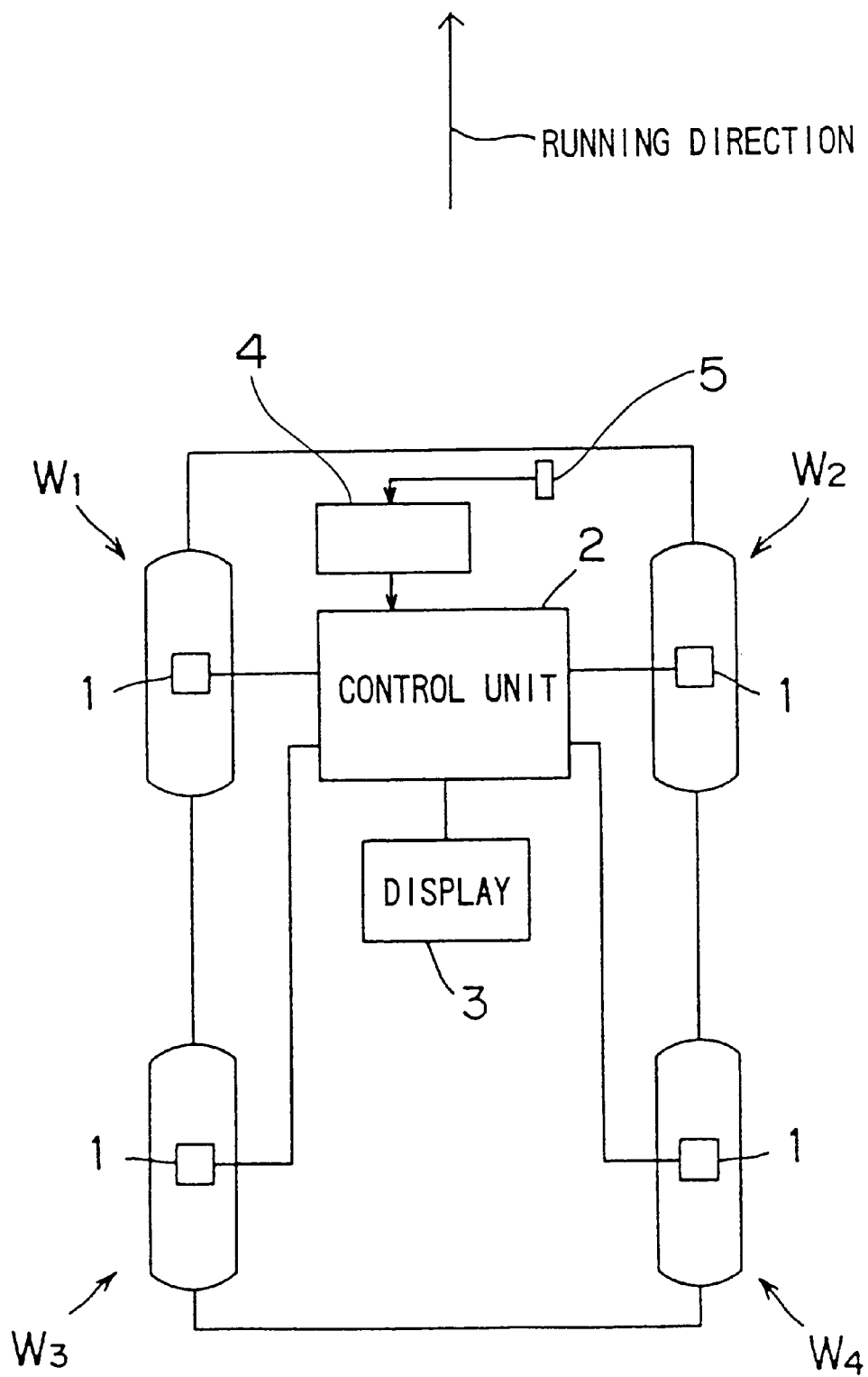
FIG. 1 is a block diagram showing the construction of a tire pressure drop detecting device to which one embodiment of the present invention is applied.

FIG. 1 is a block diagram showing the construction of a tire pressure drop detecting device to which one embodiment of the present invention is applied. This tire pressure drop detecting device detects whether the pneumatic pressures of any one of four tires $W_1$, $W_2$, $W_3$ and $W_4$ (referred to as a "tire $W_i$" hereinafter) provided for the four-tire vehicle, drop or not, respectively. The tires $W_1$ and $W_2$ correspond to right front and left front tires, and the tires $W_3$ and $W_4$ correspond to right rear and left rear tires, respectively, when looking toward the front of the vehicle.

This tire pressure drop detecting device is equipped with a per se known wheel speed sensor 1 for each wheel, which are associated with the tires $W_1$, $W_2$, $W_3$ and $W_4$, respectively. Output signals of each of the wheel speed sensors 1 are supplied to a control unit 2. An indicator 3 for informing of the presence of a tire $W_i$ whose pneumatic pressure possibly drops is connected to the control unit 2. This indicator 3 may be constructed in the form of a liquid display element, a plasma display element or a CRT.

This tire pressure drop detecting device is equipped with a foot brake operated state detecting unit 4. The foot brake operated state detecting unit 4 is used for detecting whether a driver depresses a foot break pedal 5 or not. It is possible to apply those signals used in an Antilock Braking System (ABS) to the foot brake operated state detecting unit 4. Detected output signals of the foot brake operated state detecting unit 4 are supplied to the control unit 2.

Figure 2:
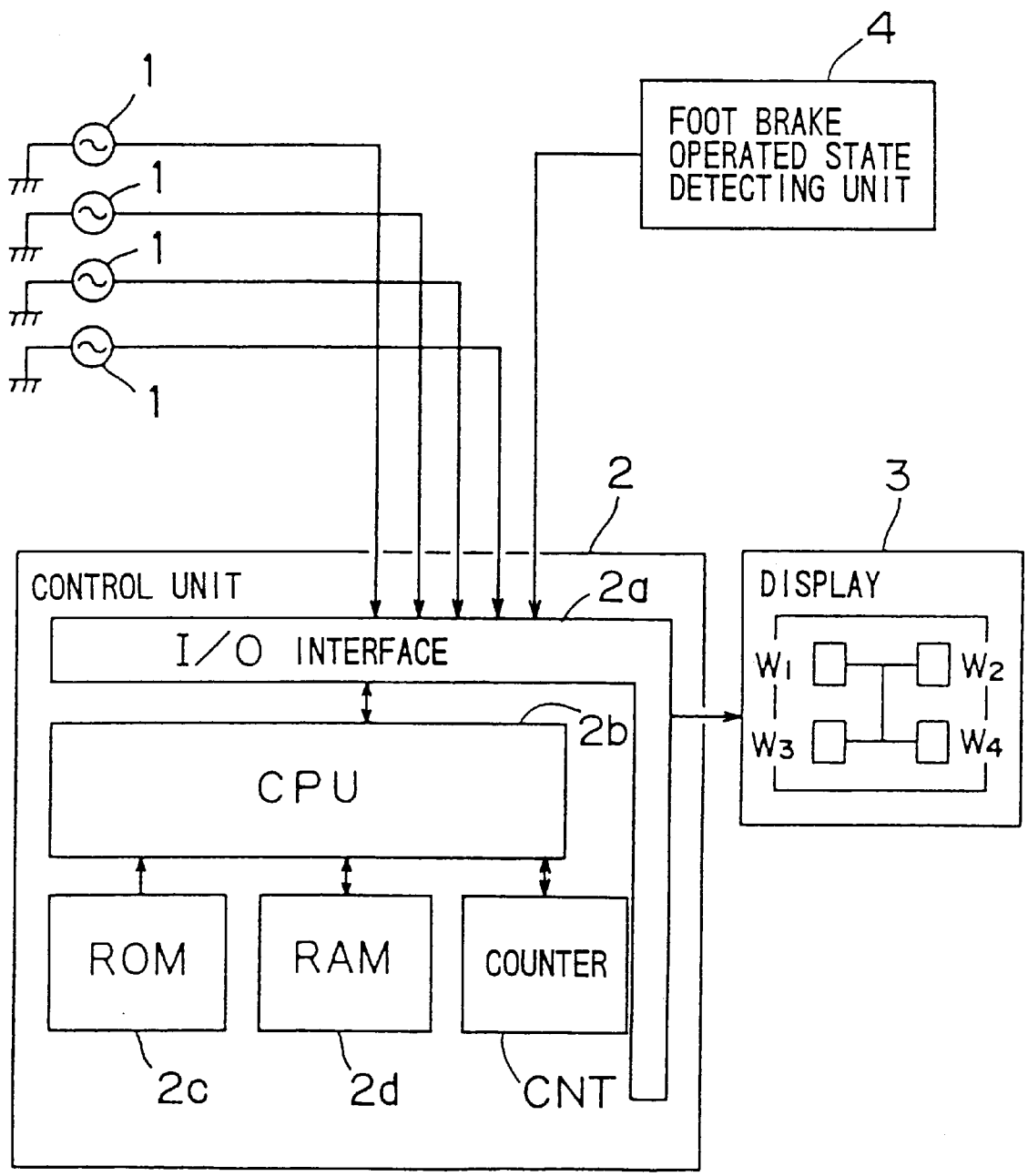
FIG. 2 is a block diagram showing the electrical construction of a tire pressure drop detecting device.

FIG. 2 is a block diagram showing the electrical construction of a tire pressure drop detecting device. The control unit 2 is composed of a micro computer including an I/O interface 2a, CPU 2b, ROM 2c, RAM 2d and a counter CNT. The I/O interface 2a is required for sending and receiving signals to and from an external device including the foot brake operated state detecting unit 4 and an indicator 3. The CPU 2b is used for executing various processing according to a control operation program stored in the ROM 2c. The RAM 2d is that in which data, etc. are temporarily written to or the written data are read out from it when the CPU 2b performs a control operation. The counter CNT is used for counting a counted value C required for alarm giving/stopping processing as described hereinafter.

Each of the wheel speed sensors 1 generates pulse signals corresponding to the rotating speed of the tire $W_i$ (referred to as a "wheel speed pulse" hereinafter). The CPU 2b calculates the rotational angular velocity $F_i$ of each tire $W_i$ on the basis of the wheel speed pulses generated from the wheel speed sensor 1 for each predetermined sampling period $\Delta T$ (sec) (e.g. $\Delta T=1$).

Figure 3:
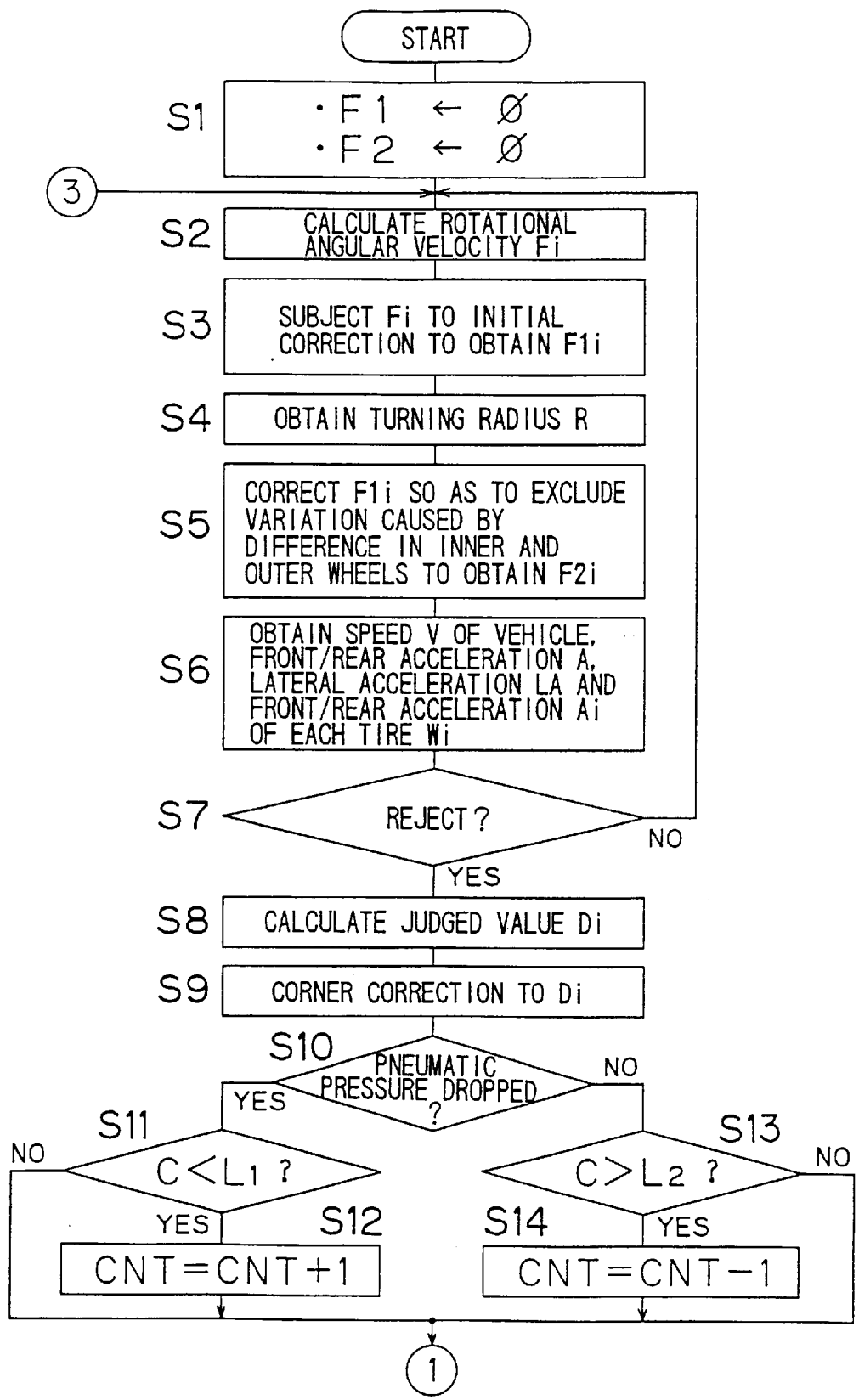
FIG. 3 is a flow chart for explaining the alarm giving/stopping processing of the tire pressure drop in the above tire pressure drop detecting device.
Figure 4:
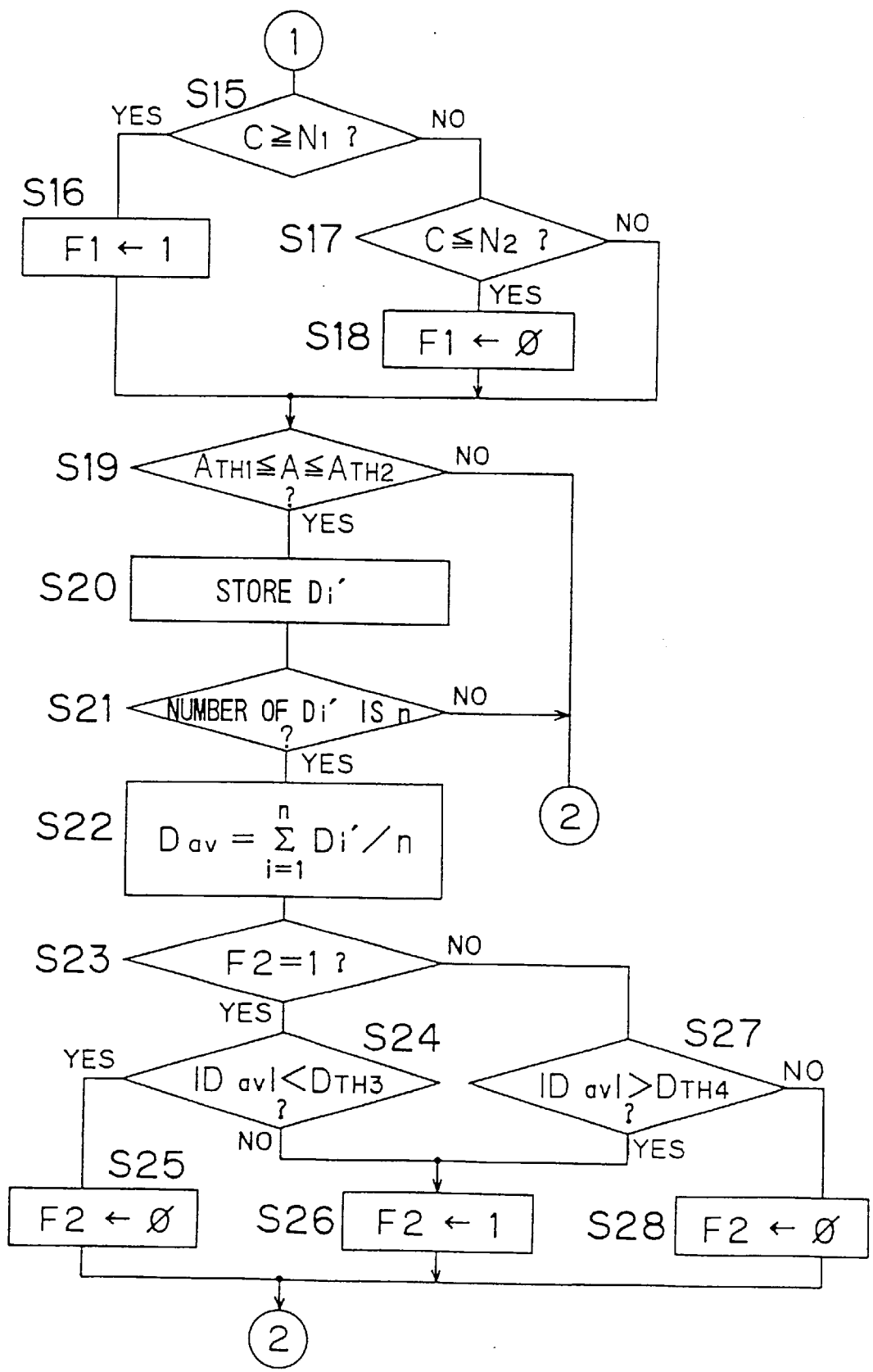
FIG. 4 is a flow chart for explaining the alarm giving/stopping processing in the above tire pressure drop detecting device.
Figure 5:
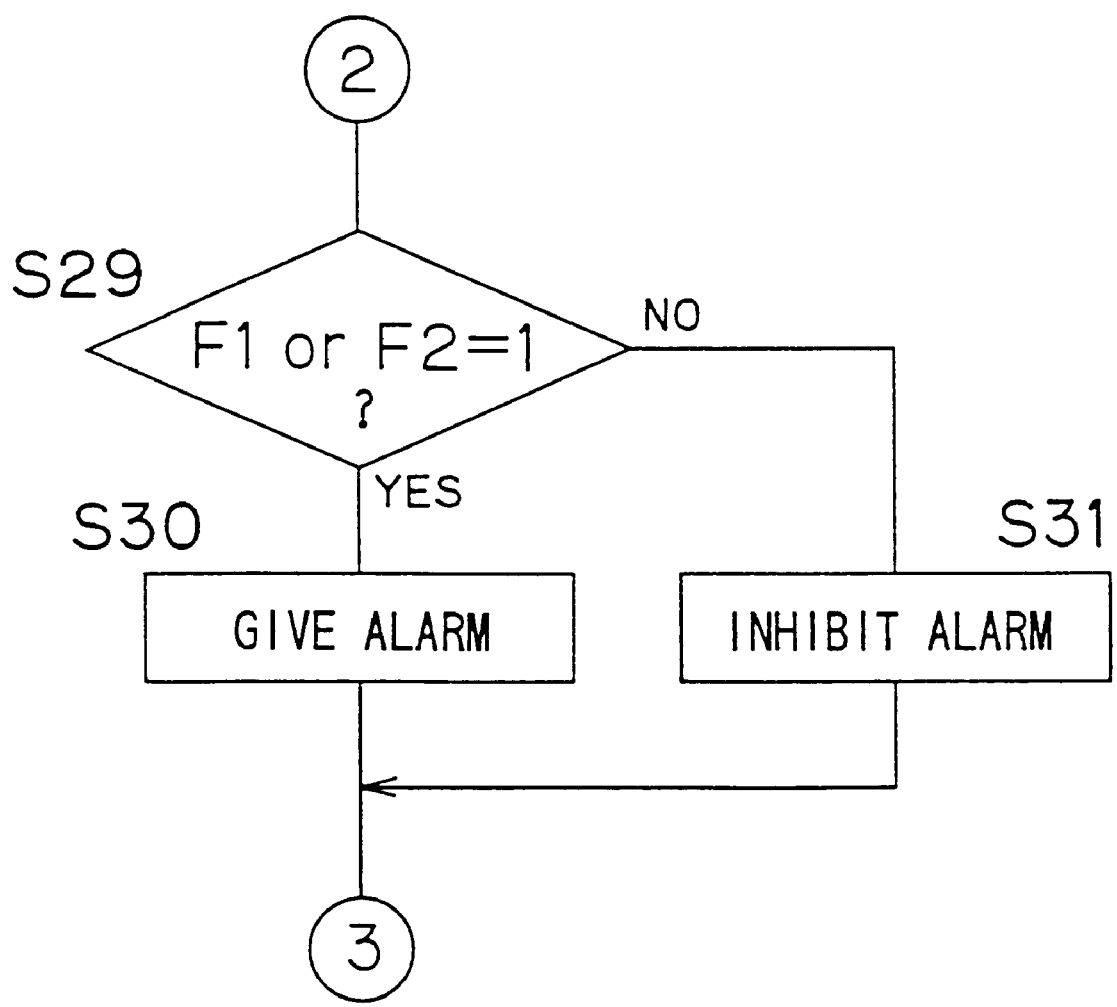
FIG. 5 is a flow chart for explaining the alarm giving/stopping processing in the above tire pressure drop detecting device.

FIG. 3, FIG. 4 and FIG. 5 are flow charts for explaining the alarm giving/stopping processing in the tire pressure drop detecting device. This processing is realized by software processing by the CPU 2b. In the following explanation, the explanation will be made with respect to an FF (front engine-front drive) vehicle as an example of the objective vehicle.

According to this tire pressure drop detection processing, flags F1 and F2 described hereinafter are firstly reset (step S1). Then, the rotational angular velocity $F_i$ of each tire $W_i$ is firstly calculated on the basis of the wheel speed pulse generated from each wheel speed sensor 1 (step S2).

Variation within a specification (hereinafter referred to as an "initial difference") is permitted with respect to the tire $W_i$ at the time of producing speed pulse. Therefore, the dynamic loading radiuses of four tires $W_i$ are not the same, necessarily, even if each of the tires $W_i$ has a normal inner pressure. Therefore, the rotational angular velocity $F_i$ of each tire $W_i$ may vary. The dynamic loading radius is a value obtained when a travel distance of the vehicle per unit time is divided by the product of the number of revolutions of each tire and $2\pi$.

Once the rotational angular velocities $F_i$ have been calculated in the step S2, the calculated rotational angular velocities $F_i$ are corrected so as to exclude the variation due to the initial difference (step S3). Specifically, the corrections according to the following equations (3) to (6) are carried out.

$$F1_1 = F_1 \quad (3)$$

$$F1_2 = mF_2 \quad (4)$$

$$F1_3 = F_3 \quad (5)$$

$$F1_4 = nF_4 \quad (6)$$

The correction factors m and n are obtained, for example, when the vehicle travels for the first time, after the tires $W_i$ have been filled with air, or after the tires $W_i$ have been replaced, and the factors are previously stored in the ROM 2c of the control unit 2. The correction factors m and n are determined, for example, by calculating the rotational angular velocities $W_i$ under the condition that the vehicle is traveling linearly and then calculating, on the basis of the calculated rotational angular velocities $F_i$, according to the following equations (7) and (8):

$$m = F_1/F_2 \quad (7)$$

$$n = F_3/F_4 \quad (8)$$

The variation in rotational angular velocities $F_i$ of the tires $W_i$ is not caused only by the initial difference. For example, a difference in turning radius (referred to as a "difference in inner and outer wheels") between the tire on the inside to a corner and tire on the outside to the corner when the vehicle is traveling around the corner is one of the causes. Furthermore, the rotational angular velocities $F_i$ may vary due to the load movement of the vehicle.

More specifically, when the vehicle is traveling around a corner, the distance from the turning center to each tire $W_i$ varies. Accordingly, a length of the locus of each tire $W_i$ varies with each tire $W_i$. As a result, the rotational angular velocity $F_i$ of each tire $W_i$ varies as a matter of course.

A lateral acceleration, which is inversely proportional to the turning radius R and proportional to the square of the velocity V of the vehicle, is exerted on the force of the vehicle in the direction from the inside to the outside of the corner. Accordingly, a partial load of the vehicle moves from the inside to the outside with respect to the corner. Thereby, the effective rolling radiuses of the following tires $W_3$ and $W_4$ (because the explanation is made with respect to an FF vehicle as the objective vehicle) vary.

Then, the turning radius R in which the influence of the load movement of the vehicle on the rotational angular velocity is excluded is firstly calculated (step S4). More specifically, the velocities $V1_3$ and $V1_4$ of the following tires $W_3$ and $W_4$ are firstly calculated, on the basis of the rotational angular velocities $F1_3$ and $F1_4$ after initial correction, as shown in the following equations (9) and (10):

$$V1_3 = r \times F1_3 \quad (9)$$

$$V1_4 = r \times F1_4 \quad (10)$$

where r is a static loading radius at the time of a normal inner pressure of the tire $W_i$, which is previously stored in the ROM 2c. The static loading radius is a distance from the center of the tire $W_i$ to the road surface when a load is applied to the tire $W_i$ which is at rest.

Then, a turning radius R' is calculated based on the calculated velocities $V1_3$ and $V1_4$ of the following tires $W_3$ and $W_4$, as shown in the following equation (11):

$$R' = \frac{Tw}{2} \times \frac{V1_4 + V1_3}{V1_4 - V1_3} \quad (11)$$

where Tw indicates a tread width (distance between right and left tires) of a following axis (rear side in case of an FF vehicle) of the vehicle.

This calculated turning radius R' of the vehicle is subjected to correction by which the variation caused by the load movement of the vehicle is excluded, as shown in the following equation (12):

$$R = R' \times \{\gamma + \sigma(V1_3 + V1_4)^2\} \quad (12)$$

where constants $\gamma$ and $\sigma$ are preferably set as follows:

$$\gamma = 1$$

$$\sigma = (1/9.8) \times (\beta/2\ Tw)$$

where $$\beta = (Q \times H \times \alpha)/(Tw \times 100)$$

Q: load of the vehicle

H: height from the ground surface of the tire to gravity center of the vehicle, and $\alpha$: variation in effective rolling radius of the tire to load Then, the rotational angular velocities $F1_i$ determined in the above step S3 are corrected, on the basis of the determined turning radius R of the vehicle, so as to exclude the variation caused by the difference in inner and outer wheels (step S5). Specifically, the correction is executed according to the following equations (13) to (16):

$$F2_1 = \frac{|R|}{\sqrt{\{(R - Tw/2)^2 + WB^2\}}} \times F1_1 \quad (13)$$

$$F2_2 = \frac{|R|}{\sqrt{\{(R + Tw/2)^2 + WB^2\}}} \times F1_2 \quad (14)$$

$$F2_3 = \frac{|R|}{|R - Tw/2|} \times F1_3 \quad (15)$$

$$F2_4 = \frac{|R|}{|R + Tw/2|} \times F1_4 \quad (16)$$

Thereby, rotating angular velocities $F2_i$ in which the variation caused by the difference in distance from the turning center between the tire $W_i$ on the inside to the corner and tire $W_i$ on the outside to the corner (difference in inner and outer wheels) is excluded can be obtained.

In the above equations (13) to (16), WB indicates a wheel base of the vehicle.

In addition, the correction according to the above equations (13) to (16) is a process performed on the assumption that the vehicle is an FF vehicle, as described above. If the vehicle is an FR (front engine-rear drive) vehicle, the correction is performed according to the following equations (17) to (20).

$$F2_1 = \frac{|R|}{|R - Tw/2|} \times FI_1 \quad (17)$$

$$F2_2 = \frac{|R|}{|R + Tw/2|} \times FI_2 \quad (18)$$

$$F2_3 = \frac{|R|}{\sqrt{\{(R - Tw/2)^2 + WB^2\}}} \times FI_3 \quad (19)$$

$$F2_4 = \frac{|R|}{\sqrt{\{(R + Tw/2)^2 + WB^2\}}} \times FI_4 \quad (20)$$

The rotational angular velocities $F_i$ sometimes contain an error depending on the turning radius R of the vehicle, velocity V of the vehicle, lateral acceleration LA of the vehicle and magnitude of front/rear acceleration $A_i$ of each tire $W_i$.

That is, when the turning radius R of the vehicle is relatively small, the tire $W_i$ is likely to cause a lateral slip and, therefore, there is much possibility that the calculated rotational angular velocities $F_i$ contain an error. In addition, when the velocity V of the vehicle is considerably low, the detection precision of the wheel speed sensor 1 becomes considerably inferior. Therefore, there is much possibility that the calculated rotational angular velocities $F_i$ contain an error. Furthermore, when the lateral acceleration LA of the vehicle is comparatively large, the tires $W_i$ are likely to cause a lateral slip and, therefore, there is much possibility that the calculated rotational angular velocities $F_i$ contain an error. Furthermore, when the front/rear acceleration $A_i$ of each tire $W_i$ is relatively large, for example, the influence of the slip of the tire $W_i$ due to rapid acceleration/deceleration of the vehicle or the influence of the foot breaking will be considered. Therefore, there is much possibility that the calculated rotational angular velocities $F_i$ contain an error.

In such cases where there is much possibility that the rotational angular velocities $F_i$ contain an error, it is preferred to reject the rotational angular velocities $F_i$ and exclude them from the detection of the pressure drop.

Then, the velocity V of the vehicle, lateral acceleration LA and front/rear acceleration $A_i$ of each tire $W_i$ are calculated (step S6). More specifically, the velocity V of the vehicle is calculated on the basis of the velocity $V2_i$ of each tire $W_i$. The velocity $V2_i$ of each tire $W_i$ is calculated according to the following equation (21):

$$V2_i = r \times F2_i \quad (21)$$

The velocity V of the vehicle is calculated, on the basis of the velocities $V2_i$ thus calculated, according to the following equation (29):

$$V2 = (V2_1 + V2_2 + V2_3 + V2_4)/4 \quad (22)$$

On the other hand, the lateral acceleration LA of the vehicle is calculated by utilizing this calculated velocity V of the vehicle according to the following equation (23):

$$LA = V^2/(R \times 9.8) \quad (23)$$

In addition, the front/rear acceleration $A_i$ of each tire $W_i$ is calculated according to the following equation (24) assuming the speed of each tire $W_i$ calculated in the sampling period before one period is $BV2_i$. The numeral 9.8 is inserted in the denominator in the following equation (24) so as to subject the front/rear acceleration $A_i$ of each tire $W_i$ to gravity acceleration conversion.

$$Ai = (V2_i - BV2_i)/(\Delta T \times 9.8) \quad (24)$$

The front/rear acceleration A of the vehicle is determined based on the front/rear acceleration $A_i$ of each tire $W_i$ according to the following equation (25)

$$A = \sum_{i=1}^{4} A_i/4 \quad (25)$$

wherein i is from 1 to 4.

The front/rear acceleration A of the vehicle may be determined by following equations (26) or (27) depending on whether the vehicle is an FF or FR vehicle.

$$A = (A_3 + A_4)/2 \quad (26)$$

$$A = (A_1 + A_2)/2 \quad (27)$$

In such way, an average value of the front/rear accelerations $A_i$ of the following tires $W_i$, to which no driving force is transmitted, is determined by the equations (26) or (27) and is taken as the front/rear acceleration A of the vehicle. The reason is as follows. That is, the driving tire $W_i$ is likely to cause a slip and, therefore, the front/rear acceleration A of the vehicle can not be accurately determined, in some cases, when the front/rear acceleration $A_i$ of the driving tire $W_i$ is utilized.

Further, the velocity V, lateral acceleration LA and front/rear acceleration $A_i$ of the vehicle may be directly determined by using sensors capable of detecting them.

On the basis of the turning radius R of the vehicle, velocity V of the vehicle, front/rear acceleration $A_i$ of each tire $W_i$ and lateral acceleration LA of the vehicle, it is judged whether the rotational angular velocities $F2_i$ obtained in the above step S5 are rejected or not (step S7). Specifically, the rotational angular velocities $F_i$ are rejected if at least one of the following four conditions is satisfied:

① $|R| < R_{TH}$ (e.g. $R_{TH} = 30$ m)
② $V < V_{TH}$ (e.g. $V_{TH} = 2.78$ m/second)
③ MAX $\{Ai\} > A_{TH}$ (e.g. $A_{TH} = 0.1$ g)
④ $LA > G_{TH}$ (e.g. $G_{TH} = 0.4$ g)

When the rotational angular velocities $F2_i$ are not rejected in the step S7, the judged value $D_i$ is calculated, on the basis of the rotational angular velocities $F2_i$, according to the following equation (28) (step S8):

$$D_i = \frac{\frac{F2_1 + F2_4}{2} - \frac{F2_2 + F2_3}{2}}{\frac{F2_1 + F2_2 + F2_3 + F2_4}{4}} \times 100 \quad (28)$$

By the way, in the calculation of the speed of the vehicle, lateral acceleration LA and front/rear acceleration $A_i$ of each tire $W_i$ in the step S6, the rotational angular velocities $F2_i$ corrected according to the initial difference and difference in inner and outer wheels of the tire $W_i$ are used. On the other hand, the dynamic loading radius of the tire $W_i$ depends on not only the initial difference and difference in inner and outer wheels, but also the turning radius R of the vehicle, velocity V, lateral acceleration LA, and front/rear acceleration A. Accordingly, the influence of variable factors including the turning radius R of the vehicle, velocity V, lateral acceleration LA, and front/rear acceleration A is contained in the judged value $D_i$ determined in step S8.

Then, the correction for excluding the influence of variable factors such as turning radius R of the vehicle, velocity V, lateral acceleration LA, and front/rear acceleration A on the judged value $D_i$ is carried out (step S9). Specifically, the correction is carried out according to the following equation (29):

$$D_i' = D_i - \frac{LA \times (\alpha 1 + \alpha 2 \times V^2 + \alpha 3 \times A)}{|R|} \quad (29)$$

The judged value $D_i'$ obtained in this step S9 is stored once in a buffer (not shown) in the CPU 2b.

In the above formula (29), $\alpha 1$, $\alpha 2$ and $\alpha 3$ respectively indicate factors. When it is known that each tire $W_i$ has a normal inner pressure, a test trip is carried out to calculate the velocity V of the vehicle, front/rear acceleration A of the vehicle, lateral acceleration of the vehicle, and turning radius R, and the factors $\alpha 1$, $\alpha 2$ and $\alpha 3$ are determined based on them. The factors $\alpha 1$, $\alpha 2$ and $\alpha 3$ thus determined are stored in the ROM 2c of the control unit.

It is judged whether the pneumatic pressure drops or not using the judged value $D_i'$, the value after correction obtained in the above step S9, according to the conditions represented by the following expression (30) (step S10). In the following expression (30), for example, $D_{TH1}=D_{TH2}=0.1$.

$$D' < -D_{TH1} \text{ or } D' > D_{TH2} \quad (30)$$

Figure 6:
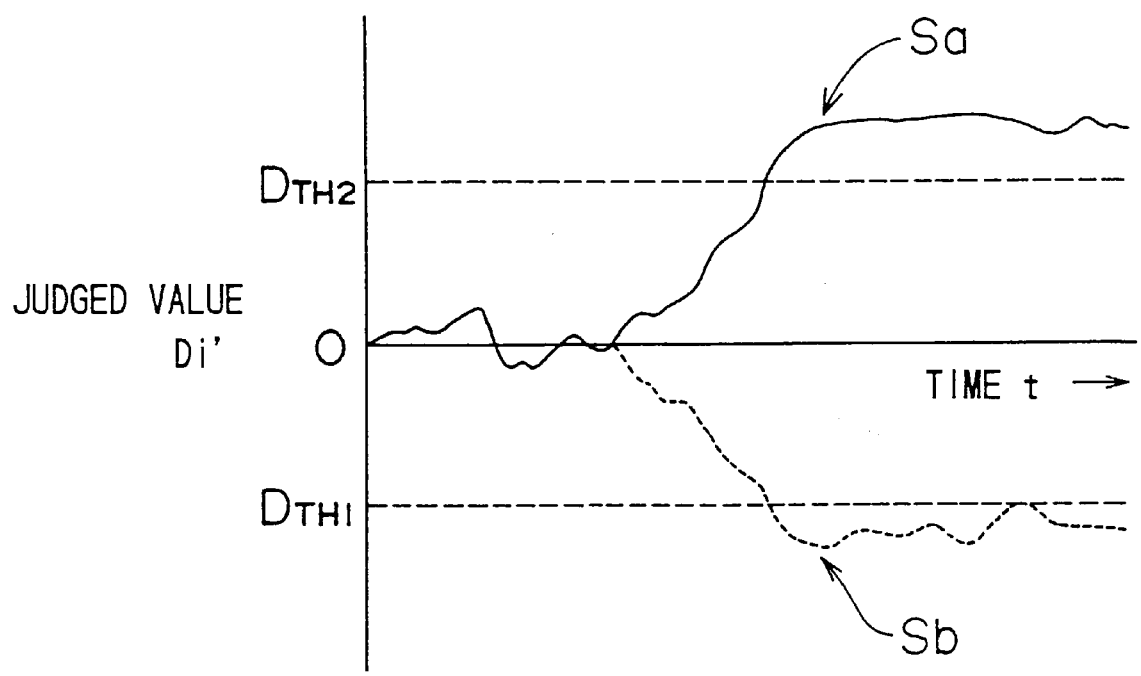
FIG. 6 is a graph for explaining the judging method of the tire pressure drop.

If the judged value D' deviates from the range between $-D_{TH1}$ and $D_{TH2}$ as shown by the symbols Sa and Sb in FIG. 6, that is, it satisfies the condition of the above expression (30), it is judged that a tire whose pneumatic pressure has dropped is present. On the other hand, when the above judged value D' is within the range between $-D_{TH1}$ and $D_{TH2}$, that is, it does not satisfy the condition of the above expression (30), it is judged that there is no tire whose pneumatic pressure has dropped.

If it is judged in step S10 that the pneumatic pressure of the tire $W_i$ has dropped, it is discriminated whether a counted value C of a counter CNT is less than an upper-limit threshold value $L_1$ (e.g. $L_1=10$) or not (step 11). The threshold value $L_1$ is predetermined so as to prevent an excessive increase in counted value C. If the counted value C is less than the upper-limit threshold value $L_1$, the counted value C is incremented (step S12). On the other hand, if the counted value C is not less than the upper-limit threshold value $L_1$, the step proceeds to the following step S15 shown in FIG. 4.

If it is judged in step S10 that the pneumatic pressure of the tire $W_i$ has not dropped, it is discriminated whether the counted value C of the counter CNT is larger than a stationary value $L_2$ (e.g. $L_2=10$) or not (step S13). The stationary value $L_2$ is predetermined so as to prevent an excessive decrease in counted value C. If the counted value C is larger than a stationary value $L_2$, the counted value C is decremented (step S14). On the other hand, if the counted value C is not more than the stationary value $L_2$, the step proceeds to the following step S15.

In the steps S15 to S18, a first alarm preparing processing is conducted.

More specifically, it is firstly judged whether the counted value C is not less than an alarm giving threshold value $N_1$ (e.g. $N_1=L_1=10$) or not (step S15). If it is judged that the counted value C is not less than the alarm giving threshold value $N_1$, a flag F1 is set so as to give an alarm (step S16).

On the other hand, if it is judged that the counted value C is less than the alarm giving threshold value $N_1$, it is then judged whether the counted value C is not more than the alarm inhibiting threshold value $N_2$ ($N_1>N_2$, e.g. $N_2=L_2=0$) or not (step S17). If it is judged that the counted value C is not more than the alarm inhibiting threshold value $N_2$, the flag $F_1$ is reset so as to inhibit the alarm from being indicated (step S18). On the other hand, if it is judged that the counted value C is larger than the alarm-inhibiting threshold value $N_2$, the step proceeds to the step S19 without conducting any processing.

In such way, setting/resetting of the flag F1 required for indicating/inhibiting of the alarm is conducted when the same judgment is successively conducted to some extent during a plurality of periods and, therefore, erroneous indicating/erroneous inhibiting of the alarm due to an expected influence of noise can be prevented.

By the way, in case that the pneumatic pressure of the tire $W_i$ drops, the rotational angular velocity $F_i$ of the tire $W_i$ becomes higher than that of the tire $W_i$ having a normal inner pressure when the vehicle is traveling under the condition where a driving torque exerted on the tire $W_i$ is small. Accordingly, the judged value $D_i'$ satisfies the expression (30) in the step S10.

On the other hand, when the vehicle is traveling under the condition where a driving torque exerted on the tire $W_i$ is large, there is little difference in rotational angular velocity $F_i$ between the tire $W_i$ whose pneumatic pressure drops and that having a normal inner pressure because of a decrease in amount of slip of the tire $W_i$. In this case, the judged value $D_i'$ is likely to become around 0 (zero). Accordingly, it is likely to be judged that the pneumatic pressure of the tires $W_i$ is normal in the step S10. As a result, even under the condition where the flag F1 should be set in the first alarm preparing processing of the steps S15 to S18, the flag F1 is not set or it is likely to take some time until the flag is set.

Therefore, in order to cope with such a situation, a second alarm-preparing process is executed (steps S19 to S28). This second alarm-preparing process is a process which is executed only when the vehicle is in the decelerated state. The reason will be described hereinafter.

In this second alarm giving process, it is examined whether the vehicle is in the decelerated state or not. Specifically, it is discriminated whether or not the front/rear acceleration A of the vehicle is a value within the predetermined range $A_E$ between a negative threshold value $A_{TH1}$ (e.g. $A_{TH1}=-0.1$) and another negative value $A_{TH2}$ (e.g. $A_{TH2}=-0.05$) whose value is larger than that of $A_{TH1}$ (step S19).

If the front/rear acceleration A of the vehicle is not within the predetermined range $A_E$, it is judged that the vehicle is not in the decelerated state and the step proceeds to the step S29 described hereinafter shown in FIG. 5 without executing the second alarm-preparing process.

On the other hand, if the front/rear acceleration A of the vehicle is within the predetermined range $A_E$ in the step S19, it is judged that the vehicle is in the decelerated state, and then the judged value D' obtained in the step S9 and held in a buffer is stored in the RAM 2d (step S20). Thereafter, it is discriminated whether the number of the judged values $D_i'$ stored in the RAM 2d reaches n (e.g. n=12) or not (step S21).

If the number of the judged values $D_i'$ stored in the RAM 2d has not reached n, the step proceeds to the step S29 described hereinafter shown in FIG. 5. On the other hand, if the number of the judged values $D_i'$ stored in the RAM 2d has reached n, an average $D_{av}$ is calculated as shown in the following equation (31) (step S22). Provided that i is within the range from 1 to n in the following equation (31).

$$D_{av} = \sum_{i=1}^{n} D_i'/n \tag{31}$$

In such way, the reason why the average $D_{av}$ of the judged value $D_i'$ is determined is as follows. That is, it is to prevent the alarm from erroneously indicating due to the erroneous judged value $D_i'$ caused by noise or the like.

When the average value $D_{av}$ is obtained, it is discriminated whether a flag F2 is set or not so as to judge whether the alarm is being indicated or not at present (step 23).

The flag F2 is used for representing whether the alarm is to be indicated or not, similar to the flag F1. They are different in that the flag F1 uses the judged value $D_i'$ as the fundamental information while the flag F2 uses the average value $D_{av}$ of the judged value $D_i'$ as the fundamental information.

If the flag F2 is set in the step S23, it is discriminated whether or not an absolute value of the average value $D_{av}$ is less than a predetermined first threshold value $D_{TH3}$ (e.g. $D_{TH3}$=0.05) (step S24), as described in the following expression (32):

$$|D_{av}|<D_{TH3} \tag{32}$$

If the equation (32) is satisfied, it is judged that the pneumatic pressure of all tires $W_i$ is a normal inner pressure. On the other hand, the fact that the flag F2 is set means the fact that the alarm is being indicated at present. Accordingly, this alarm is an erroneous alarm. Therefore, the flag F2 is reset so as to stop the erroneous alarm (step S25).

On the other hand, when the expression (32) is not satisfied, it is judged that there is a tire whose pneumatic pressure has dropped. Accordingly, the alarm being indicated at present is a correct alarm. Therefore, the flag F2 is maintained in the state of being set so as to continue the alarm (step S26).

If the flag F2 is not set in step S23, it is discriminated whether or not an absolute value of the average value $D_{av}$ is bigger than a second threshold value $D_{TH4}$ which is less than the first threshold value $D_{TH3}$ (e.g. $D_{TH4}$=0.1) or not (step S27), as described in the following expression (33):

$$|D_{av}|>D_{TH4} \tag{33}$$

If the equation (33) is satisfied, it is judged that there is a tire whose pneumatic pressure has dropped. Accordingly, the flag F2 is set so as to indicate an alarm (step S26). On the other hand, if the expression (33) is not satisfied, it is judged that the pneumatic pressure of all the tires $W_i$ is a normal inner pressure and the flag F2 is maintained in the state of being reset (step S28).

In such way, hysteresis characteristics are imparted by changing the threshold value for deciding setting/resetting of the flag F2 to the first threshold value $D_{TH3}$, then second threshold value $D_{TH4}$, thereby making it possible to obtain the following effect. That is, the erroneous alarm is not easily indicated and, when an alarm is once indicated, the alarm is not easily stopped.

As described above, as a result of the steps 15 to 18 and steps S19 to S28, the flags F1 and F2 are set or reset.

In the step S29 shown in FIG. 5, it is discriminated whether any one of the flags F1 and F2 is set or not. If any one of them is reset, it is discriminated that the pneumatic pressure of any tire $W_i$ has dropped and an alarm is indicated (step S30). This alarm is indicated, for example, in the display 3 shown in FIG. 1. On the other hand, if both flags F1 and F2 are reset, it is judged that the pneumatic pressure of all tires $W_i$ is normal and indication of the alarm is inhibited (step S31).

With respect to the indication of the alarm, it becomes more convenient for the driver to inform which tire's pneumatic pressure drops than to merely inform the fact that the pneumatic pressure of any tire drops. Therefore, it is preferred that the tire $W_i$ whose pneumatic pressure has dropped is specified before or immediately after the alarm is indicated, using the method described hereinafter.

By using the judged value D' obtained according to the above equation (29), it is possible to specify that:

the reduced pressure tire is $W_1$ or $W_4$ if D'>0, and the reduced pressure tire is $W_2$ or $W_3$ if D'<0.

Furthermore, in the above case, if the vehicle is traveling linearly, it is possible to specify that:

the reduced pressure tire is $W_1$ if $F2_1$>$F2_2$, the reduced pressure tire is $W_2$ if $F2_1$<$F2_2$, the reduced pressure tire is $W_3$ if $F2_3$>$F2_4$, and the reduced pressure tire is $W_4$ if $F2_3$<$F2_4$.

Once the tire $W_i$ whose pneumatic pressure has dropped has been specified, the results are outputted to the display 3 for display. The display form in the display 3 is as follows. That is, as shown in FIG. 2, a lamp corresponding to the tire whose pneumatic pressure has dropped among displaying lamps corresponding to four tires $W_1$, $W_2$, $W_3$ and $W_4$, respectively, may be turned on, or turned on and off.

Next, the reason why the second alarm-preparing process is executed only when the vehicle is in the decelerated state will be explained.

Since driving/braking forces are given to the driving tire $W_i$, the velocity V of the vehicle and velocity $V_i$ of the tire $W_i$ are different. As a measure representing the degree of the difference, a so-called slip rate S is separately defined during driving (accelerating) and braking (decelerating) as shown in the following equations (34) and (35):

$$S=(V-rF_i)/rF_i(S<0) \tag{34}$$

$$S=(V-rF_i)/V(S>0) \tag{35}$$

The equation (34) is for driving, and the equation (35) is for braking. The equations (34) and (35) can be modified into the following equations (36) and (37), respectively:

$$rF_i=V/(1+S)(S<0) \tag{36}$$

$$rF_i=V\times(1-S)(S>0) \tag{37}$$

On the other hand, the slip rate S can also be represented by the following equation (38) until the tire $W_i$ reaches a grip limitation.

$$S=2F_x/(C_x \times W_D \times L^2) \tag{38}$$

In the above equation (38), $F_x$ is a driving/braking force ($F_x$<0 at the time of driving, $F_x$>0 at the time of raking), $C_x$ is a front/rear shear elastic modulus per unit area of a rubber constituting the tire $W_i$, $W_D$ is a width of the ground surface (the surface in contact with the ground) of the tire $W_i$ and L is a length of the ground surface of the tire $W_i$.

The equation (38) is substituted into the above equations (36) and (37) to give the following equations (39) and (40), respectively:

$$rF_i = \frac{V}{1 + \{2F_x/(C_x \times W_D \times L^2)\}} \quad (39)$$

$$rF_i = V \times \{1 - 2F_x/(C_x \times W_D \times L^2)\} \quad (40)$$

By the way, when the pneumatic pressure of the tire $W_i$ drops, the static loading radius r of the tire $W_i$ becomes small. On the other hand, the ground area of the tire $W_i$ increases. In the tire $W_i$ whose pneumatic pressure drops, therefore, the static loading radius r of the tire $W_i$, width $W_D$ of the ground surface of the tire $W_i$, and length L of the ground surface of the tire $W_i$ can be respectively represented in the following formulas (41), (42) and (43).

$$r - \Delta r \text{ (provided } 0 < \Delta r < r) \quad (41)$$

$$W_D + \Delta WD \text{ (provided } 0 < \Delta W_D) \quad (42)$$

$$L + \Delta L \text{ (provided } 0 < L) \quad (43)$$

When the above equation (39) corresponding to the time of driving is modified utilizing these formulas (41) to (43), the rotational angular velocity $\omega_0$ of the tire $W_i$ having a normal inner pressure is represented by the following equation (44) and the rotational angular velocity $\omega_1$ of the tire $W_i$ whose pneumatic pressure drops is represented by the following equation (45).

$$\omega_0 = \frac{1}{r} \times \frac{V}{1 + \{2F_x/(C_x \times W_D \times L^2)\}} \quad (44)$$

$$\omega_1 = \frac{1}{r - \Delta r} \times \frac{V}{1 + [2F_x/\{C_x \times (W_D + \Delta W) \times (L + \Delta L)^2\}]} \quad (45)$$

The following facts ① and ② can be derived from the above equations (44) and (45).

① The decrease in static loading radius r of the tire $W_i$ caused by the pneumatic pressure drop is a factor in increasing the rotational angular velocity $\omega_1$ of the tire $W_i$.

② Since $F_x < 0$ at the time of driving, the second term of the above equation (45) becomes smaller than the second term of the above equation (44) (because $C_x \times W_D \times L^2 < C_x \times (W_D + \Delta W) \times (L + \Delta L)^2$) Accordingly, a tendency to increase the rotational angular velocity $\omega_1$ of the tire $W_i$ whose pneumatic pressure drops is inhibited.

The above driving/braking force $F_x$ can be represented by the following equation (46):

$$-F_x = \mu_r \times W_g + \mu_1 \times Q \times V^2 + W_g \times \sin\theta + (W_g + W_r) \times A/g \quad (46)$$

In the above equation (46), $\mu_r$ is a rolling resistance, $W_g$ is a total weight of the vehicle, $\mu_1$ is an air resistance, Q is a front projected area of the vehicle, θ is an angle of inclination, $W_r$ is a weight corresponding to rotating part, and g is acceleration due to gravity.

As is apparent from this equation (46), the driving/braking force $|F_x|$ increases according to the square of the velocity V of the vehicle and increases with the increase of the front/rear acceleration A. Accordingly, the driving/braking force $|F_x|$ increases when the vehicle is traveling at high speed or traveling on an upward slope. Therefore, the part of parentheses in the above equation (45) becomes smaller. As a result, the tendency of the above item ② is promoted. Therefore, the difference between the rotational angular velocity $\omega_1$ of the tire $W_i$ whose pneumatic pressure drops and rotational angular velocity $\omega_0$ of the tire $W_i$ having a normal inner pressure disappears when driving.

On the other hand, when the above equation (40) corresponding to braking is modified utilizing the above formulas (41) to (43), the rotational angular velocity $\omega_0$ of the tire $W_i$ having a normal inner pressure is represented by the following equation (47) and the rotational angular velocity $\omega_1$ of the tire $W_i$ whose pneumatic pressure drops is represented by the following equation (48).

$$\omega_0 = \frac{V}{r} \times \left(1 - \frac{2F_x}{C_x \times W_D \times L^2}\right) \quad (47)$$

$$\omega_1 = \frac{V}{r - \Delta r} \times \left\{1 - \frac{2F_x}{C_x \times (W_D + \Delta W) \times (L + \Delta L)^2}\right\} \quad (48)$$

The following facts ①' and ②' can be derived from the above equations (47) and (48).

①' The decrease in the static loading radius r of the tire $W_i$ caused by the pneumatic pressure drop is a factor for increasing the rotational angular velocity $\omega_1$ of the tire $W_i$.

②' Since $Fx > 0$ at the time of braking, the factor within braces of the above equation (48) becomes larger than the factor within parentheses of the above equation (47). Accordingly, a tendency to increase the rotational angular velocity $\omega_1$ of the tire $W_i$ whose pneumatic pressure drops is promoted. Therefore, a difference between the rotational angular velocity $\omega_1$ of the tire $W_i$ whose pneumatic pressure drops and rotational angular velocity $\omega_0$ of the tire $W_i$ having a normal inner pressure becomes large when braking.

As described above, the difference between the rotational angular velocity $\omega_1$ of the tire $W_i$ whose pneumatic pressure drops and rotational angular velocity $\omega_0$ of the tire $W_i$ having a normal inner pressure, disappears when the driving torque exerted on the vehicle is large. To the contrary, the difference becomes large when the driving torque exerted on the vehicle is small.

Figure 7:
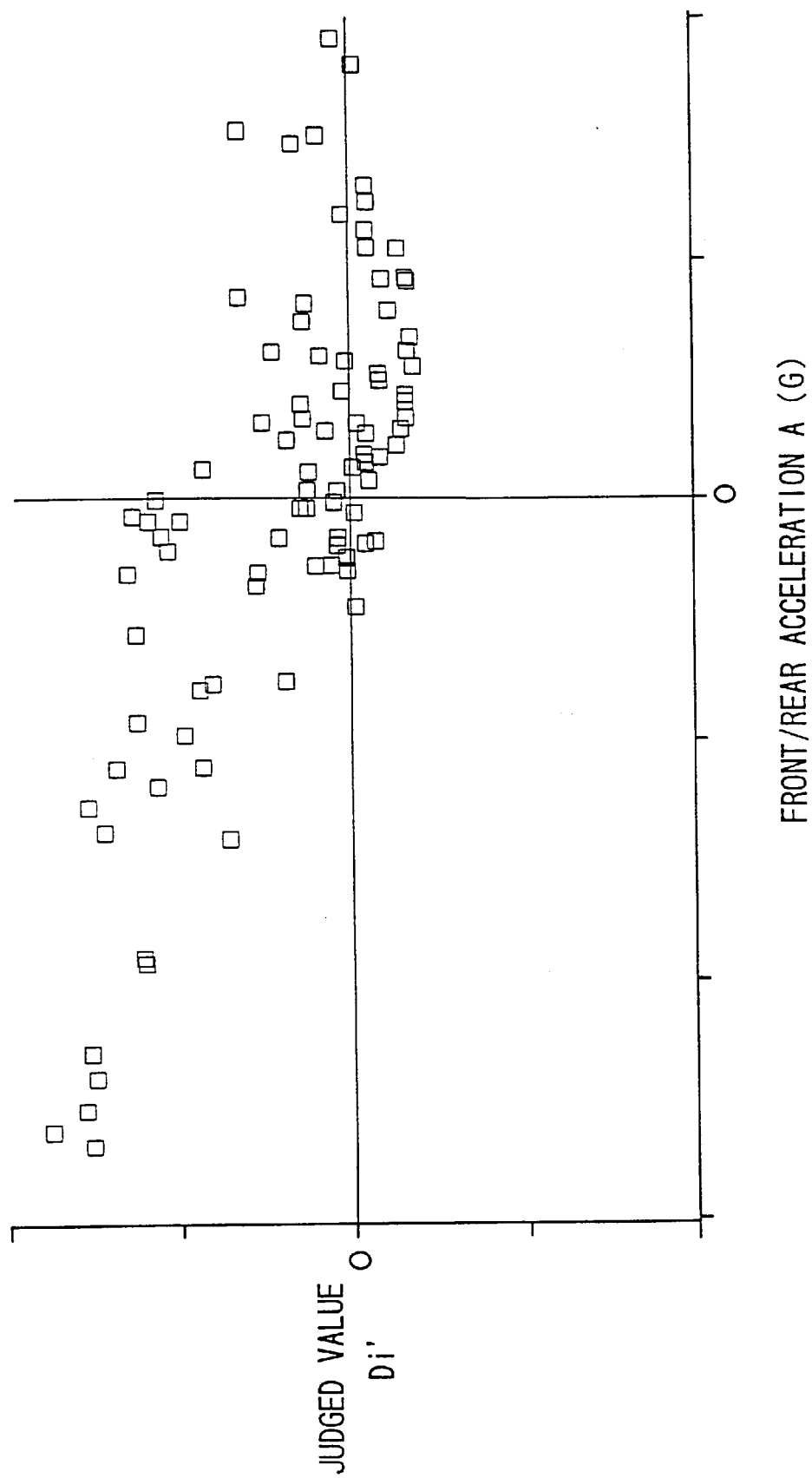
FIG. 7 is a graph for explaining the fact that the judged value becomes a value other than 0 (zero) when the vehicle is traveling at high speed with a negative front/rear acceleration.

Accordingly, the judged value $D_i'$ in a case where the pneumatic pressure of any one of the tires $W_i$ drops takes a value other than 0 (zero) when the vehicle is in a decelerated state (the front/rear acceleration A is within the negative range), as shown in FIG. 7. Therefore, the second alarm-preparing process is executed only when the vehicle is in a decelerated state.

As described above, according to the tire pressure drop detecting device of this embodiment, the judgment of whether the pneumatic pressure has dropped or not is conducted only when the vehicle is in a decelerated state, wherein the difference between the rotational angular velocity $\omega_1$ of the tire $W_i$ the pneumatic pressure drops, and the rotational angular velocity $\omega_0$ of the tire $W_i$ the inner pressure is normal becomes large. Accordingly, it is accurately judged whether the pneumatic pressure of the tire $W_i$ has dropped or not. Therefore, it is possible to indicate/inhibit the alarm accurately, thereby making it possible to drive the vehicle safely.

The mode for carrying out the present invention is explained above, but the present invention is not limited to the above embodiments. In the above embodiments, the second alarm-preparing process is executed by the steps S19 to S28 shown in FIG. 4, but the processing of the steps S22 to S28 in the steps S19 to S28 may be replaced by the processing of the steps P1 to P4 shown in FIG. 8.

Figure 8:
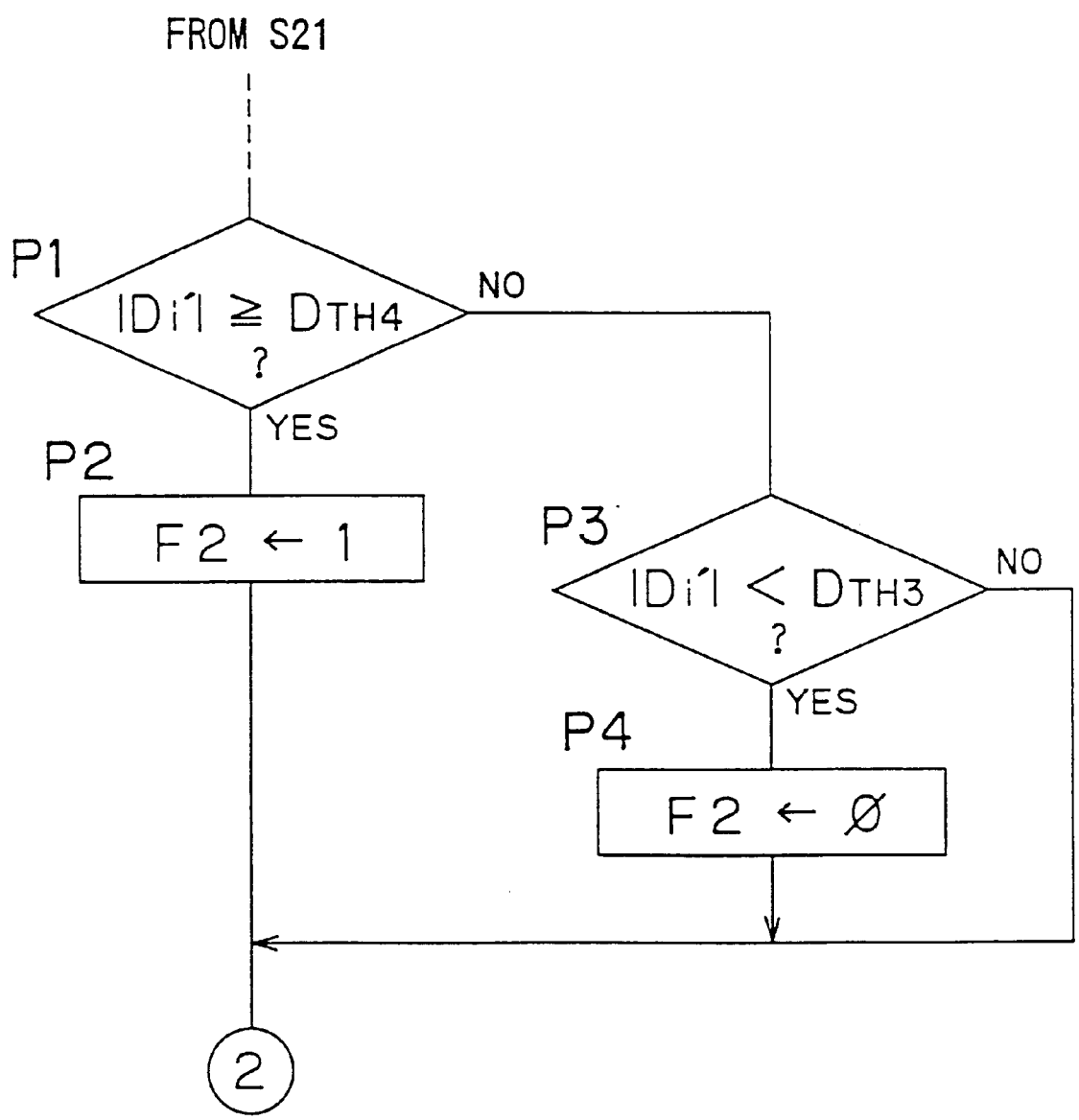
FIG. 8 is a flow chart for explaining the alarm giving processing in the tire pressure drop detecting device to which another embodiment of the present invention is applied.

More specifically, as shown in FIG. 8, when the number of judged values $D_i'$ stored in the RAM 2d reaches n, it is discriminated whether the absolute value of all judged values Di' is not less than the second threshold value $D_{TH4}$ or not (step P1). If the absolute value of all judged values $D_i'$ is not less than the second threshold value $D_{TH4}$, it is judged that the pneumatic pressure of any tire $W_i$ has dropped and the flag F2 is set so as to indicate the alarm (step P2).

On the other hand, if at least one absolute value of the judged values $D_i'$ is less than the second threshold value $D_{TH4}$, it is then discriminated whether or not the absolute value of all judged values $D_i'$ is less than the first threshold value $D_{TH3}$, which is smaller than the above second threshold value $D_{TH4}$ (step P3). If the absolute value of all judged values $D_i'$ is less than the first threshold value $D_{TH3}$, it is judged that all the tires $W_i$ have a normal inner pressure and the flag F2 is reset (step P4).

In the above embodiment, the front/rear acceleration A of the vehicle is determined based on the rotational angular velocities $F2_i$ of the tires $W_i$, and it is discriminated whether the vehicle is in the decelerated state or not, based on the determined front/rear acceleration A of the vehicle. And if it is discriminated that the vehicle is in the decelerated state, the judging processing of the pneumatic pressure drop is performed.

However, when the foot brake pedal is depressed, even if the vehicle is in the decelerated state, the rotational angular velocities $F2_i$ of the tires $W_i$ vary depending on the degree of wear of the brake pads of the tires $W_i$. Therefore, it becomes impossible to accurately judge the pneumatic pressure drop.

Figure 9:
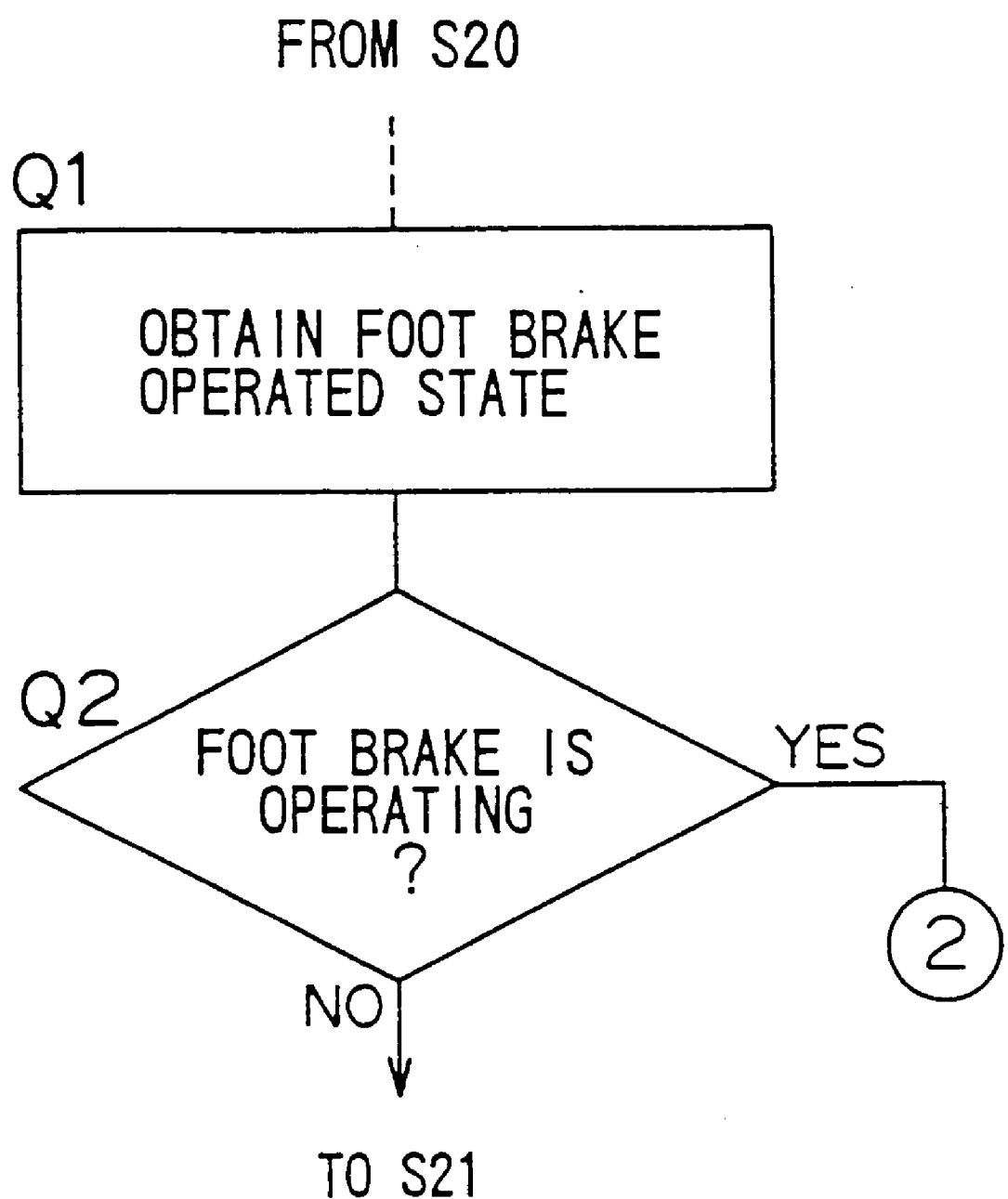
FIG. 9 is a flow chart for explaining the alarm giving processing in the tire pressure drop detecting device to which another embodiment of the present invention is applied.

Therefore, the processing shown in FIG. 9 may be inserted between the steps S20 and S21 of FIG. 4.

More specifically, when it is discriminated that the vehicle is in the decelerated state ("YES" in the step S19), a foot brake operated state is obtained from the foot brake operated state detecting unit 4 (step Q1). Then, it is discriminated whether the foot brake pedal 5 is depressed or not, based on the obtained foot brake operated state (step Q2). If the foot brake pedal 5 is not depressed, the step proceeds to the step S21. On the other hand, if the foot brake pedal 5 is depressed, the step proceeds to the step S29.

According to this arrangement, execution of the second alarm-preparing process is inhibited when breaking due to depression of the foot brake pedal 5 and, therefore, it is possible to accurately indicate the alarm.

In the above embodiment, the setting/resetting operation of the flag F2 in the second alarm-preparing process is not executed until the number of the judged values D' stored in the RAM 2d reaches n so as to remove an unexpected noise due to the traveling state of the vehicle and the like. That is, the condition (filtering length) wherein execution of the above operation is permitted is fixed.

However, the filtering length may be appropriately changed according to the velocity of the vehicle. That is, when the vehicle is traveling at high speed, the traveling state of the vehicle and road surface state are comparatively stable. Accordingly, the unexpected noise is hardly included in the rotational angular velocity $F_i$. Therefore, even if the filtering length is shortened, an accuracy of the judgment of the pneumatic pressure drop is hardly influenced. When the tire $W_i$ is punctured, the tire is likely to burst when the vehicle is traveling at high speed. Accordingly, it is preferred to make it possible to detect tire pressure reduction in an early stage by shortening the filtering length when the vehicle is traveling at high speed.

Figure 10:
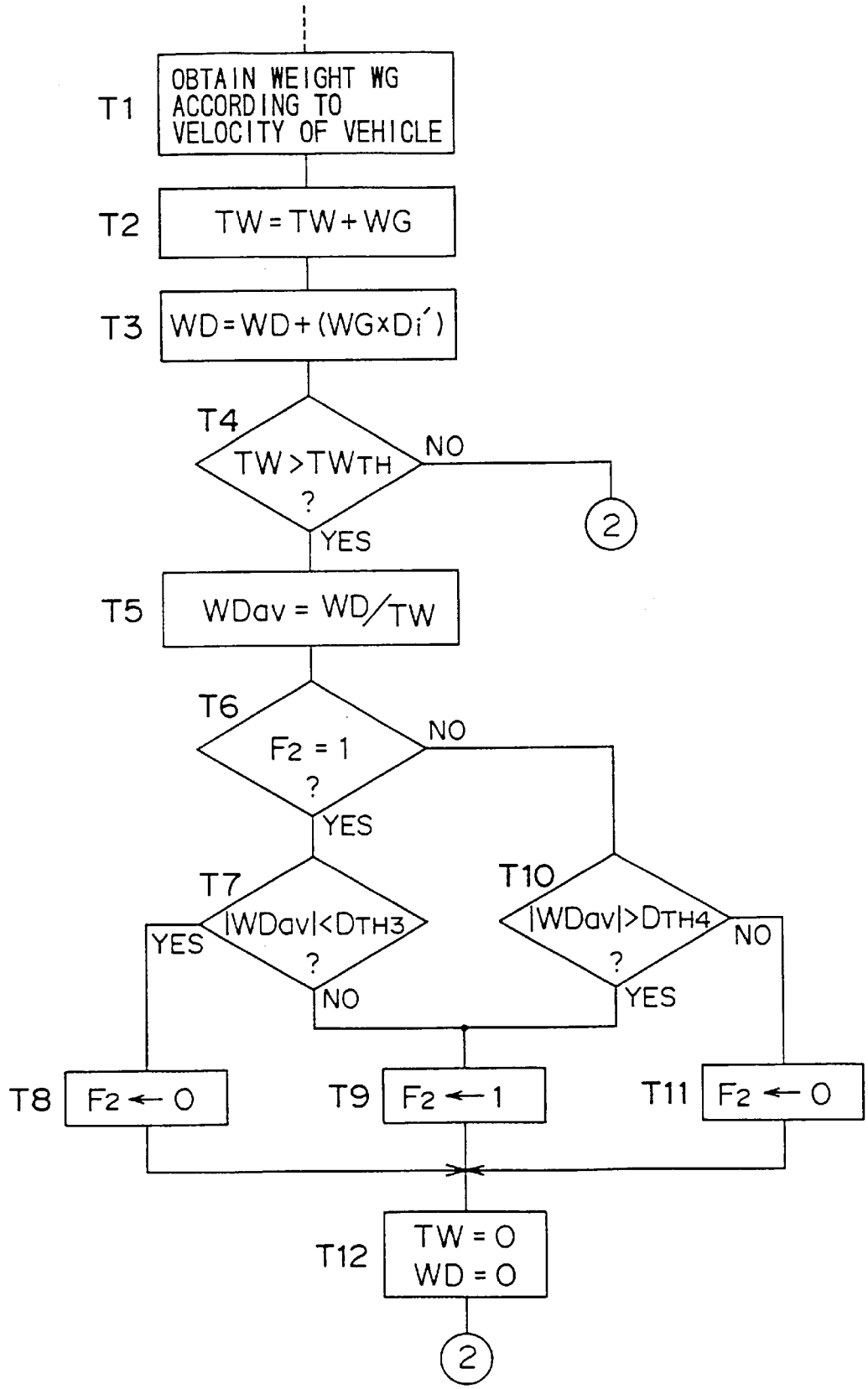
FIG. 10 is a flow chart for explaining the alarm giving processing in the tire pressure drop detecting device to which another embodiment of the present invention is applied.

Therefore, the second alarm-preparing process of the steps S21 to S28 shown in FIG. 4 may be replaced by the process represented by the flow chart shown in FIG. 10.

FIG. 10 is a flow chart for explaining the process of changing the filtering length according to the velocity of the vehicle. In this process, the velocity of the vehicle obtained in the step S6 of FIG. 3 is referred and a weight WG corresponding to the velocity of the vehicle is obtained (step T1). Specifically, the weight WG corresponding to the velocity of the vehicle is obtained, based on a function f(V) which is previously stored in the ROM 2c.

Figure 11A:
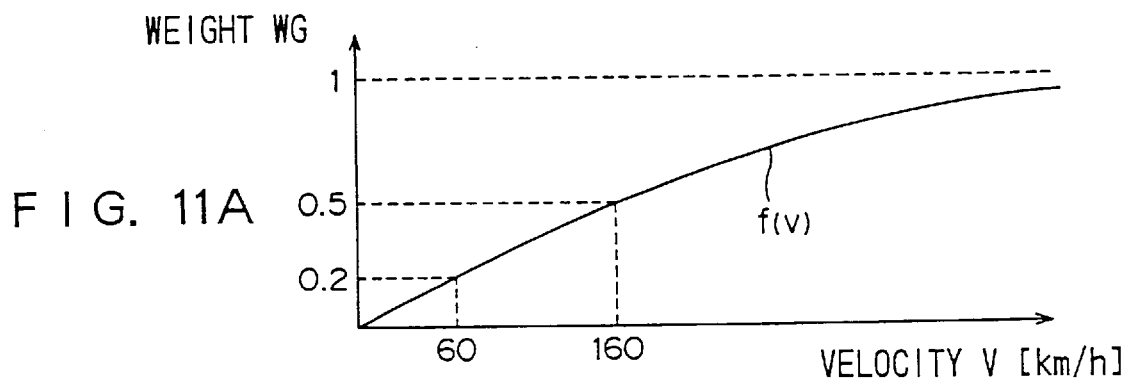
FIG. 11A and FIG. 11B are graphs showing the relationship between the velocity of the vehicle and the weight thereof.
Figure 11B:
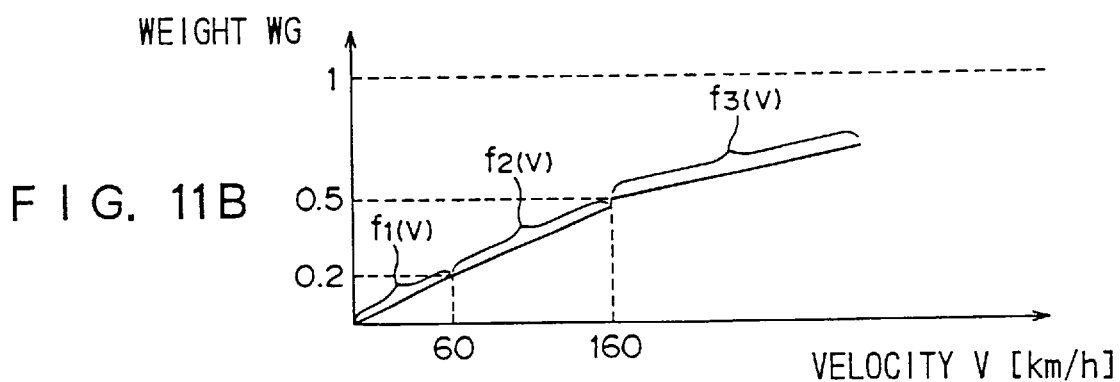
Figure 12:
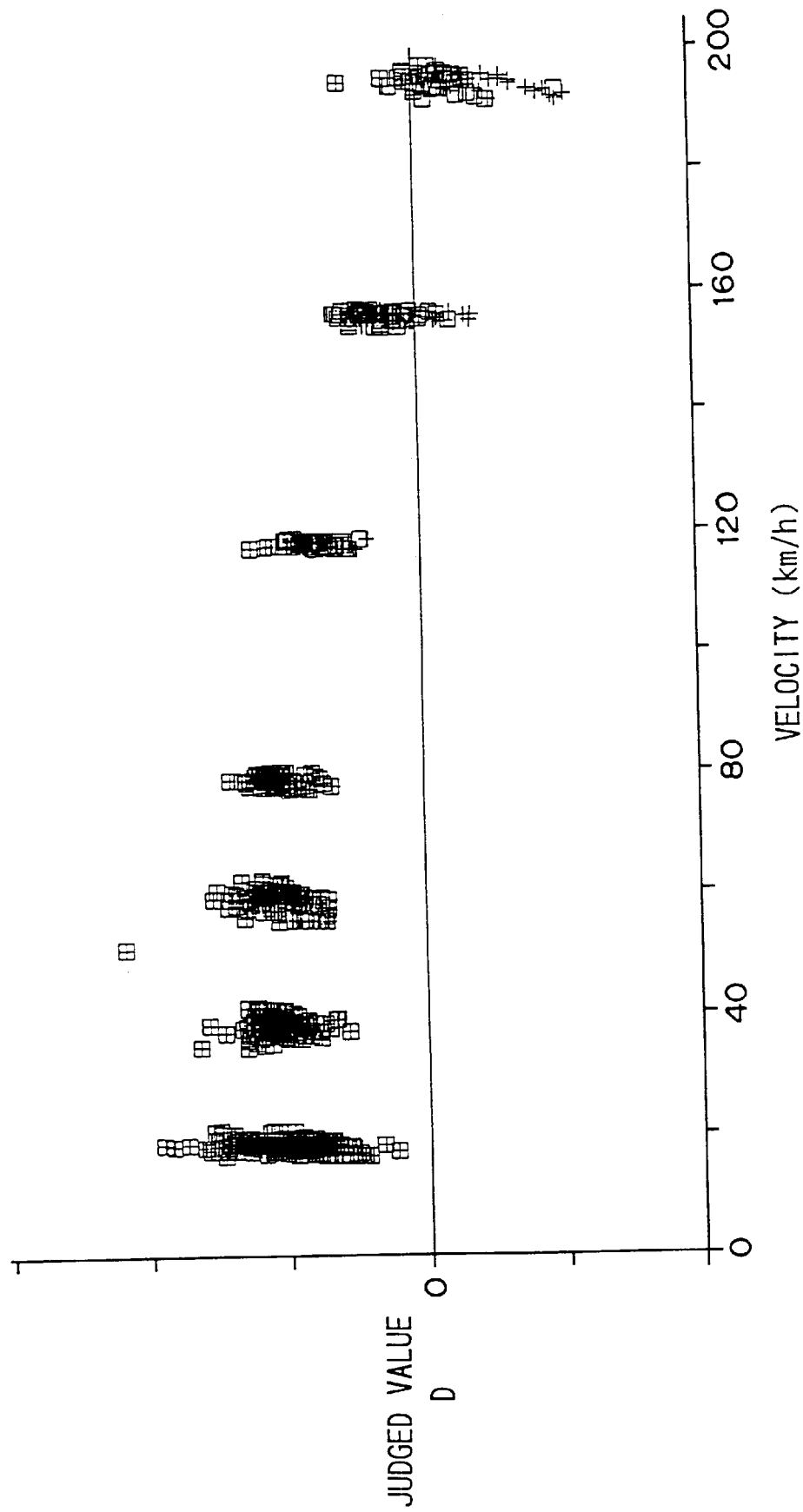
FIG. 12 is a graph for explaining the fact that the judged value approaches 0 (zero) because a large driving force is exerted on the tire whose pneumatic pressure drops.

The function f(V) is represented, for example, by the curve shown in FIG. 11A, and the velocity of the vehicle V corresponds to the weight WG in the ratio of 1:1. The weight WG is adjusted so as to approach "1", without limit. In the case of storage in the ROM 2c, it is preferred to store in the form of a bent line obtained by dividing the function f(V) into a plurality of linear functions $f_1(V)$, $f_2(V)$, $f_3(V)$ . . . , as shown in FIG. 11B, and connecting the respective linear functions $f_1(V)$, $f_2(V)$, $f_3(V)$ . . . for the sake of convenience.

Once the weight WG is obtained, the weight WG is accumulated to be utilized when the average of the judged values $D_i'$ is determined in the following step (step T12). Specifically, a weight WG is further added to an accumulated value TW of the previous weights WG to determine a new accumulated value TW. The judged value $D_i'$ which has been obtained in the step S9 and stored in the buffer is multiplied by the obtained weight WG and the calculation results are accumulated (step T3). Specifically, the calculation results ($D_i' \times$WG) are added to the accumulated value WD of the previous calculation results to determine a new accumulated value WD.

Thereafter, it is discriminated whether the accumulated value TW of the weight WG exceeds a fixed predetermined value $TW_{TH}$ or not (step T4). If the accumulated value TW does not exceed the predetermined value $TW_{TH}$, it is judged that the filtering length is not enough to conduct filtering and the step proceeds to the step S29 of FIG. 5. On the other hand, if the accumulated value TW exceeds the predetermined value $TW_{TH}$, it is judged that the filtering length is enough to conduct filtering and an average value $WD_{av}$ of the accumulated value WD of the judged values $D_i'$ (step T5). Specifically, the accumulated value WD is divided by the accumulated value TW of the weight WG.

Thereafter, if the absolute value of the average value $WD_{av}$ determined in the step T5 is larger than the second threshold value $D_{TH4}$, the flag F2 is set, similar to the process of FIG. 4. If the absolute value of the average value $WD_{av}$ determined in the step T5 is less than the first threshold value $D_{TH3}$, which is smaller than the second threshold value $D_{TH4}$, the flag F2 is reset (step T6 to T11).

After the completion of the above process, the accumulated value TW of the weight WG and accumulated value WD of the judged value $D_i'$ are cleared for preparing the following process (step T12).

As described above, according to this construction, setting/resetting of the flag F2 is executed corresponding to the fact that the accumulated value TW of the weight WG exceeds the predetermined value $TW_{TH}$. The weight WG is approximately proportional to the velocity of the vehicle (see FIG. 11A). Accordingly, the faster the velocity of the vehicle, the shorter the filtering length becomes, comparatively. Therefore, rapid indicating/erasing of the alarm can be realized when the vehicle is traveling at high speed where little noise arises. When the velocity of the vehicle is slow, the filtering length becomes long, relatively. Therefore, indicating/erasing of the alarm can be realized in a safe and reliable manner when the vehicle is traveling at low speed where an large quantity of noise arises.

The embodiments of the present invention have been described in detail, hereinabove, but the description should be considered as illustrative and not restrictive, the spirit and scope of the present invention being limited only by the appended claims.

This application is based on the application No. 8-12122 filed in Japan, the content of which is incorporated herein by reference.

What is claimed s:

1. A tire pressure drop detecting method, comprising the steps of:

detecting a rotational angular velocity of a tire provided for a vehicle, detecting a front/rear acceleration of the vehicle, discriminating whether the vehicle is in a predetermined decelerated state or not, based on the detected front/rear acceleration of the vehicle, and judging whether the pneumatic pressure of the tire has dropped, based on the detected rotational angular velocity, only under the condition that it is discriminated that the vehicle is in the predetermined decelerated state.

2. A method according to claim 1, wherein the deceleration state discriminating step includes a step of discriminating that the vehicle is in the predetermined decelerated state provided that the detected front/rear acceleration is within a negative predetermined range.

3. A method according to claim 1, wherein the deceleration state discriminating step includes a step of discriminating that the vehicle is not in the predetermined decelerated state when a foot brake pedal provided for the vehicle is operated.

4. A method according to claim 1, wherein the front/rear acceleration detecting step includes the steps of:

determining front/rear accelerations with respect to a plurality of tires, respectively, based on rotational angular velocities detected with respect to the plurality of tires, and determining the front/rear acceleration of the vehicle by averaging the front/rear accelerations of the plurality of tires.

5. A method according to claim 1, wherein the front/rear acceleration detecting step includes the steps of:

determining front/rear accelerations with respect to a plurality of following tires to which no driving force is transmitted, respectively, based on rotational angular velocities detected with respect to the plurality of following tires, and determining the front/rear acceleration of the vehicle by averaging the front/rear accelerations of the plurality of following tires.

6. A method according to claim 1, wherein the pneumatic pressure drop judging step includes the steps of:

determining a judged value by substituting the detected rotational angular velocity into a predetermined judging equation, holding the determined judged value in holding means when it is discriminated that the vehicle is in the decelerated state, discriminating whether a predetermined number of the judged values are held in the holding means or not, and judging whether the pneumatic pressure of the tire has dropped, based on a plurality of the judged values held in the holding means, if it is discriminated that the predetermined number of the judged values are held in the holding means.

7. A method according to claim 6, wherein the step of judging whether the pneumatic pressure of the tire has dropped based on a plurality of the judged values includes a step of judging whether the pneumatic pressure of the tire has dropped, based on an average of the plurality of the judged values.

8. A method according to claim 7, wherein the step of judging whether the pneumatic pressure of the tire has dropped based on an average of the plurality of the judged values, includes the steps of:

resetting a flag representing an existence of a reduced-pressure tire when an absolute value of the average value is less than a predetermined first threshold value, and setting a flag representing an existence of a reduced-pressure tire when an absolute value of the average value exceeds a predetermined second threshold value which is larger than the first threshold value.

9. A method according to claim 8, further comprising the steps of:

indicating an alarm when the flag is set, and inhibiting an alarm from being indicated when the flag is reset.

10. A method according to claim 6, wherein the step of judging whether the pneumatic pressure of the tire has dropped based on a plurality of the judged values, includes the steps of:

resetting a flag representing an existence of a reduced pressure tire when all absolute values of the plurality of the judged values are less than a predetermined first threshold value, and setting a flag representing an existence of a reduced pressure tire when all absolute values of the plurality of the judged values exceed a predetermined second threshold value which is larger than the first threshold value.

11. A method according to claim 10, further comprising the steps of:

indicating an alarm when the flag is set, and inhibiting an alarm from being indicated when the flag is reset.

12. A method according to claim 1, wherein the pneumatic pressure drop judging step includes the steps of:

determining a judged value by substituting the detected rotational angular velocity into a predetermined judging equation, detecting a velocity of the vehicle, weighting the determined judged value using a weight according to the detected velocity of the vehicle when it is discriminated that the vehicle is in the decelerated state, accumulating the judged value weighted by the weight, accumulating the weight, discriminating whether the accumulated weight is not less than a predetermined weight threshold value, and judging whether the pneumatic pressure of the tire has dropped, based on a ratio of the accumulated judged value to the accumulated weight, if it is discriminated that the accumulated weight is not less than the weight threshold value.

13. A method according to claim 12, wherein the step of judging whether the pneumatic pressure of the tire has dropped based on the ratio of the accumulated judged value to the accumulated weight, includes the steps of:

resetting the flag representing an existence of a reduced pressure tire if an absolute value of the ratio is less than a predetermined first ratio threshold value, and setting a flag representing an existence of a reduced pressure tire if the absolute value of the ratio exceeds a predetermined second ratio threshold value which is larger than the first threshold value.

14. A method according to claim 13, further comprising the steps of:
indicating an alarm when the flag is set, and
inhibiting an alarm from being indicated when the flag is reset.

15. A method according to claim 12, further comprising a step of adjusting the weight so as to increase with an increase of the detected velocity of the vehicle.

16. A tire pressure drop detecting device, comprising:
rotational angular velocity detecting means for detecting a rotational angular velocity of a tire provided for a vehicle,
acceleration detecting means for detecting a front/rear acceleration of the vehicle,
decelerated state discriminating means for discriminating whether the vehicle is in a predetermined decelerated state, based on the front/rear acceleration of the vehicle detected by the acceleration detecting means, and
pneumatic pressure drop judging means for judging whether the pneumatic pressure of the tire has dropped, based on the rotational angular velocity detected by the rotational angular velocity detecting means, only under the condition that it is discriminated by the decelerated state discriminating means that the vehicle is in the predetermined decelerated state.

17. A tire pressure drop detecting device according to claim 16, wherein the decelerated state discriminating means includes means for discriminating whether the front/rear acceleration of the vehicle detected by the acceleration detecting means is within a negative predetermined range, the decelerated state discriminating means discriminating that the vehicle is in the predetermined decelerated state if it is discriminated that the front/rear acceleration of the vehicle is within the negative predetermined range.

18. A tire pressure drop detecting device according to claim 16, wherein the decelerated state discriminating means includes means for judging whether a foot brake pedal provided for the vehicle is operated, and means for discriminating that the vehicle is not in the predetermined decelerated state if the foot brake pedal is operated.

19. A tire pressure drop detecting device according to claim 16, wherein the acceleration detecting means includes means for determining front/rear accelerations with respect to a plurality of tires, respectively, based on rotational angular velocities detected with respect to the plurality of tires by the rotational angular velocity detecting means, and means for determining the front/rear acceleration of the vehicle by averaging the front/rear accelerations of the plurality of tires.

20. A tire pressure drop detecting device according to claim 16, wherein the acceleration detecting means includes means for determining front/rear accelerations with respect to a plurality of following tires to which no driving force is transmitted, respectively, based on rotational angular velocities detected with respect to the plurality of following tires by the rotational angular velocity detecting means, and means for determining the front/rear acceleration of the vehicle by averaging the front/rear accelerations of the plurality of following tires.

21. A tire pressure drop detecting device according to claim 16, wherein the pneumatic pressure drop judging means includes:
judged value operating means for determining a judged value by substituting the rotational angular velocity detected by the rotational angular velocity detecting means into a predetermined judging equation,
holding means for holding the judged value determined by the judged value operating means when it is discriminated by the decelerated state discriminating means that the vehicle is in the decelerated state,
number discriminating means for discriminating whether a predetermined number of the judged values are held in the holding means, and
judged value examining means for judging whether the pneumatic pressure of the tire has dropped, based on a plurality of the judged values held in the holding means, if it is discriminated by the number discriminating means that the predetermined number of the judged values are held in the holding means.

22. A tire pressure drop detecting device according to claim 21, wherein the judged value examining means includes average value operating means for determining an average value of a plurality of the judged values held in the holding means, and means for judging whether the pneumatic pressure of the tire has dropped, based on the average value determined by the average value operating means.

23. A tire pressure drop detecting device according to claim 22, wherein the means for judging whether the pneumatic pressure of the tire has dropped based on the average value includes:
means for resetting a flag representing an existence of a reduced pressure tire when an absolute value of the average value is less than a predetermined first threshold value, and
means for setting a flag representing an existence of a reduced pressure tire when the absolute value of the average value exceeds a predetermined second threshold value which is larger than the first threshold value.

24. A tire pressure drop detecting device according to claim 23, further comprising:
means for indicating an alarm when the flag is set, and
means for inhibiting an alarm from being indicated when the flag is reset.

25. A tire pressure drop detecting device according to claim 21, wherein the judged value examining means includes:
means for resetting a flag representing an existence of a reduced pressure tire when all absolute values of a plurality of the judged values are less than a predetermined first threshold value, and
means for setting a flag representing an existence of the reduced pressure tire when all absolute values of a plurality of the judged values exceed a predetermined second threshold value which is larger than the first threshold value.

26. A tire pressure drop detecting device according to claim 25, further comprising:
means for indicating an alarm when the flag is set, and
means for inhibiting an alarm from being indicated when the flag is reset.

27. A tire pressure drop detecting device according to claim 16, wherein the pneumatic pressure drop judging means includes:
judged value operating means for determining a judged value by substituting the rotational angular velocity detected by the rotational angular velocity detecting means into a predetermined judging equation,
velocity detecting means for detecting a velocity of the vehicle,
weighting means for weighting the judged value determined by the judged value operating means using a weight according to the velocity of the vehicle detected by the velocity detecting means if it is discriminated by the decelerated state discriminating means that the vehicle is in the decelerated state, judged value accumulating means for accumulating the judged value weighted by the weighting means, weight accumulating means for accumulating the weight, judging time discriminating means for discriminating whether the weight accumulated by the weight accumulating means is not less than a predetermined weight threshold value, and judged value examining means for judging whether the pneumatic pressure of the tire has dropped, based on a ratio of the judged value accumulated by the judged value accumulating means to the weight accumulated by the weight accumulating means, when it is discriminated by the judging time discriminating means that the weight accumulated by the weight accumulating means is not less than the weight threshold value.

28. A tire pressure drop detecting device according to claim 27, wherein the judged value examining means includes:

means for resetting a flag representing an existence of a reduced pressure tire when an absolute value of the ratio is less than a predetermined first ratio threshold value, and means for setting a flag representing an existence of a reduced pressure tire when the absolute value of the ratio exceeds a predetermined second ratio threshold value which is larger than the first threshold value.

29. A tire pressure drop detecting device according to claim 28, further comprising:

means for indicating an alarm when the flag is set, and means for inhibiting an alarm from being indicated when the flag is reset.

30. A tire pressure drop detecting device according to claim 27, further comprising means for adjusting the weight so as to increase with an increase of the detected velocity of the vehicle.

* * * * *